US012764097B2

(12) United States Patent
Bailey et al.

(10) Patent No.: US 12,764,097 B2
(45) Date of Patent: Oct. 13, 2026

(54) NETWORK EGRESS ACCESS CONTROL WITH UNTRUSTED INTERMEDIARY

(71) Applicant: Snowflake Inc., Bozeman, MT (US)

(72) Inventors: David B. Bailey, Signal Mountain, TN (US); Brandon S. Baker, Redmond, WA (US); Andreas Emil Bauer, Berlin (DE); Derek Denny-Brown, Seattle, WA (US); Shengda Wang, Los Gatos, CA (US); Ethan Grant Young, Seattle, WA (US); Haowei Yu, Newark, CA (US); Thant Htoo Zaw, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 47 days.

(21) Appl. No.: 18/614,312

(22) Filed: Mar. 22, 2024

(65) Prior Publication Data

US 2025/0300969 A1 Sep. 25, 2025

(51) Int. Cl.
*H04L 9/40* (2022.01)

(52) U.S. Cl.
CPC ................................ *H04L 63/0428* (2013.01)

(58) Field of Classification Search
CPC .................................................. H04L 63/0428
See application file for complete search history.

(56) References Cited

U.S. PATENT DOCUMENTS 11,122,083 B1 * 9/2021 Quevedo ............. H04L 63/0236
11,295,009 B2 4/2022 Brossard et al.
11,409,864 B1 8/2022 Baker et al.
11,546,323 B1 1/2023 Jones et al.
11,620,110 B1 4/2023 Du et al.
11,755,291 B1 9/2023 Du et al.
11,822,690 B1 * 11/2023 Sultan ................ G06F 21/6227
11,930,045 B1 3/2024 Baker et al.
2004/0088333 A1 5/2004 Sidman
2009/0254884 A1 10/2009 Rama et al.
2012/0041752 A1 2/2012 Wang et al.
(Continued)

FOREIGN PATENT DOCUMENTS

CN 110197064 A 9/2019
CN 110855653 A 2/2020
(Continued)

OTHER PUBLICATIONS

"U.S. Appl. No. 17/834,668, Non Final Office Action mailed Sep. 9, 2022", 14 pgs.

(Continued)

*Primary Examiner* — Vance M Little
(74) *Attorney, Agent, or Firm* — Schwegman Lundberg & Woessner, P.A.

(57) ABSTRACT

A network egress request is received from a container service within a cloud data platform. A cryptographically signed egress policy associated with the network egress request is received by a trusted service controller of the cloud data platform. The network egress request is validated against the cryptographically signed egress policy. Based on the validation, a determination of whether the network egress request complies with the cryptographically signed egress policy is established. Upon validation, the network egress request is granted or denied based on the determination.

20 Claims, 14 Drawing Sheets

(56) References Cited

U.S. PATENT DOCUMENTS

| | | | | |
|---|---|---|---|---|
| 2012/0191642 | A1 | 7/2012 | George | |
| 2012/0191690 | A1 | 7/2012 | George | |
| 2012/0239612 | A1 | 9/2012 | George et al. | |
| 2013/0205287 | A1 | 8/2013 | Aslot et al. | |
| 2015/0172260 | A1* | 6/2015 | Brenner | H04L 63/061 713/171 |
| 2015/0309980 | A1 | 10/2015 | Glass et al. | |
| 2017/0099188 | A1 | 4/2017 | Chang et al. | |
| 2018/0101583 | A1 | 4/2018 | Li et al. | |
| 2021/0209243 | A1* | 7/2021 | Gallardo | G06F 21/6227 |
| 2021/0406311 | A1 | 12/2021 | Brossard et al. | |
| 2022/0391492 | A1 | 12/2022 | Baker et al. | |
| 2023/0066013 | A1 | 3/2023 | Ball | |
| 2023/0393816 | A1 | 12/2023 | Du et al. | |
| 2024/0143572 | A1 | 5/2024 | Ayyannan et al. | |
| 2024/0333646 | A1* | 10/2024 | Kaciulis | H04L 45/76 |
| 2024/0364744 | A1 | 10/2024 | Baker et al. | |
| 2025/0280043 | A1 | 9/2025 | Baker et al. | |

FOREIGN PATENT DOCUMENTS

| | | |
|---|---|---|
| CN | 114096964 A | 2/2022 |
| CN | 118869234 | 10/2024 |

OTHER PUBLICATIONS

"U.S. Appl. No. 17/834,668, Notice of Allowance mailed Jan. 17, 2023", 18 pgs.
"U.S. Appl. No. 17/834,668, Response filed Dec. 9, 2022 to Non Final Office Action mailed Sep. 9, 2022", 11 pgs.
"U.S. Appl. No. 18/104,020, Corrected Notice of Allowability mailed Aug. 10, 2023", 2 pgs.
"U.S. Appl. No. 18/104,020, Notice of Allowance mailed May 10, 2023", 19 pgs.
"U.S. Appl. No. 18/309,024, Non Final Office Action mailed Jul. 19, 2023", 11 pgs.
"U.S. Appl. No. 18/309,024, Notice of Allowance mailed Nov. 8, 2023", 7 pgs.
"U.S. Appl. No. 18/309,024, Response filed Oct. 19, 2023 to Non Final Office Action mailed Jul. 19, 2023", 13 pgs.
"European Application Serial No. 24172624.9, Extended European Search Report mailed Jun. 7, 2024", 9 pages.
U.S. Appl. No. 18/309,024 U.S. Pat. No. 11,930,045, filed Apr. 28, 2023, Secure Network Access From Sandboxed Applications.
U.S. Appl. No. 18/428,890, filed Jan. 31, 2024, Secure Execution of User-Defined Functions.
"U.S. Appl. No. 18/428,890, Non Final Office Action mailed Dec. 18, 2024", 10pages.
"U.S. Appl. No. 18/428,890, Response filed Jan. 30, 2025 to Non Final Office Action mailed Dec. 18, 2024", 14 pages.
"U.S. Appl. No. 18/428,890, Notice of Allowance mailed Mar. 18, 2025", 7 pages.
"U.S. Appl. No. 18/428,890, Corrected Notice of Allowability mailed Apr. 24, 2025", 2 pages.
"Chinese Application Serial No. 202410531666.3 , Voluntary Amendment Filed May 14, 2025", with English claims 11 pages.
"Chinese Application Serial No. 202410531666.3, Office Action mailed Jul. 9, 2025", with manual English translation, 15 pages.
"Chinese Application Serial No. 202410531666.3, Response filed Oct. 31, 2025 to Office Action mailed Jul. 9, 2025", with English claims, 21 pages.
"U.S. Appl. No. 19/213,325, Non Final Office Action mailed Jul. 1, 2026", 8 pgs.

* cited by examiner

NETWORK EGRESS ACCESS CONTROL WITH UNTRUSTED INTERMEDIARY

TECHNICAL FIELD

The subject matter disclosed herein generally relates to methods, systems, machine storage mediums, and computer programs for implementing network egress access control with untrusted intermediaries.

BACKGROUND

Network-based database systems can be provided through a cloud data platform, which allows organizations, customers, and users to store, manage, and retrieve data from the cloud. Cloud data platforms are widely used for data storage and data access in computing and communication contexts. With respect to architecture, a cloud data platform could be an on-premises data platform, a network-based data platform (e.g., a cloud-based data platform), another type of architecture, or some combination thereof. With respect to type of data processing, a cloud data platform could implement online analytical processing (OLAP), online transactional processing (OLTP), a combination of the two, another type of data processing, or some combination thereof. Moreover, a cloud data platform could be or include a relational database management system (RDBMS) or one or more other types of database management systems.

In an implementation of a cloud data platform, a given database (e.g., a database maintained for a customer account) can reside as an object within (e.g., a customer account) that can also include one or more other objects (e.g., users, roles, privileges, and/or the like). Furthermore, a given object, such as a database, can itself contain one or more objects such as schemas, tables, materialized views, and/or the like. A given table can be organized as a collection of records (e.g., rows) that each include a plurality of attributes (e.g., columns). In some implementations, database data can be physically stored across multiple storage units, which may be referred to as files, blocks, partitions, micro-partitions, and/or by one or more other names. In many cases, a database on a cloud data platform serves as a backend for one or more applications that are executing on one or more application servers.

Data engineers are focused primarily on building and maintaining data pipelines that transport data through different steps and put it into a usable state. The data engineering process encompasses the overall effort required to create data pipelines that automate the transfer of data from place to place and transform that data into a specific format for a certain type of analysis. In that sense, data engineering is an ongoing practice that involves collecting, preparing, transforming, and delivering data. A data pipeline helps automate these tasks so they can be reliably repeated.

BRIEF DESCRIPTION OF THE SEVERAL VIEWS OF THE DRAWINGS

The present disclosure will be apparent from the following more particular description of examples of embodiments of the technology, as illustrated in the accompanying drawings. The drawings are not necessarily to scale, emphasis instead being placed upon illustrating embodiments of the present disclosure. In the drawings, like numerals may describe similar components in different views. Like numerals having different letter suffixes may represent different instances of similar components. The drawings illustrate generally, by way of example, but not by way of limitation, various embodiments discussed in the present document. Various ones of the appended drawings merely illustrate example embodiments of the present disclosure and should not be considered as limiting its scope.

DETAILED DESCRIPTION

Figure 1:
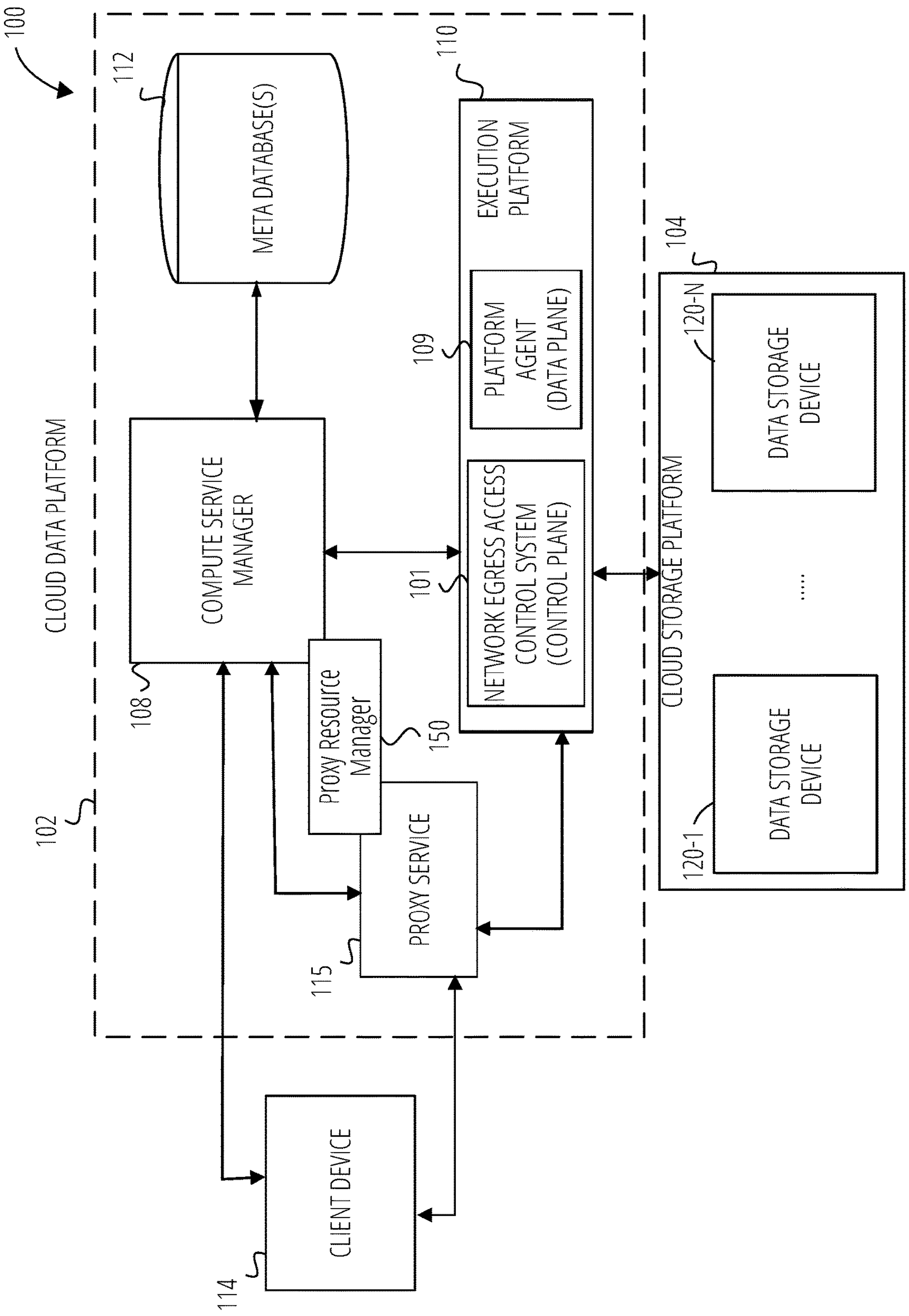
FIG. 1 illustrates an example computing environment that includes a cloud data platform in communication with a cloud storage provider system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter can be practiced without these specific details.

In general, well-known instruction instances, protocols, structures, and techniques are not necessarily shown in detail.

In a containerized environment, network policies, extended Berkeley Packet Filter (eBPF) programs, and Virtual Ethernet (veth) devices work together to enforce security controls, especially for managing network traffic in and out of containers (e.g., traffic ingress and egress) with an untrusted intermediary. For example, network policies define the rules, eBPF programs enforce these rules at the kernel level, and the secure egress veth provides the pathway for egress traffic to be controlled by these mechanisms. This integrated approach ensures that only authorized traffic can leave the container (or pod in Kubernetes), enhancing the security posture of the containerized environment. Network policies are resources that define rules for controlling the traffic between container or pod groups. The primary goal of network policies is to provide a layer of network security that restricts the communication to only allowed paths, thereby reducing the attack surface within a cluster. eBPF programs can be attached to various hooks in the Linux kernel, allowing them to be used for a wide range of purposes, including networking, security, and performance monitoring. In the context of network security, eBPF programs are used to dynamically enforce network policies at the kernel level, inspect and manipulate packets, and provide additional security checks. A secure egress veth refers to a virtual ethernet device that is specifically configured to handle and secure outbound traffic from a container. It is part of a veth pair, with one end in the container's namespace and the other in the host's namespace. The secure egress veth is responsible for routing the container's egress traffic through security controls, which may include eBPF programs and adherence to network policies.

Administrators define network policies, specifying which containers or pods can communicate and what external services they can access, including access to or via untrusted intermediaries. BPF programs are attached to the secure egress veth interfaces or other kernel hooks to monitor and enforce the network policies. These programs can inspect packets and make decisions based on the rules defined in the network policies. When a container sends outbound traffic, it goes through the secure egress veth. The attached eBPF program intercepts this traffic. The eBPF program checks the traffic against the network policies. If the traffic is allowed, the program permits it to continue to its destination. If not, the traffic is dropped, and the container is effectively prevented from communicating with the disallowed service or pod.

Example embodiments of the present disclosure are related to providing a network egress firewall for Container Services (CS), such as a developer framework and programming environment container service, referred to as a framework and environment container service (FECS). Container services customers associated with a cloud data platform need the ability to specify their service's networking configuration, especially as it pertains to egress policy to the public Internet. Example embodiments of the present disclosure support this capability by improving upon external access integration by providing container services customers with the opportunity to interact with External Access Integration (EAI) objects. EAI objects can include a variety of different software constructs, such as: middleware, APIs, data adapters, and the like to help enable real-time information access across various systems. EAI objects combine network rules and secrets to govern external access for traffic. Network rules, often referred to as firewall rules or security rules, are specific directives that govern the behavior of network traffic. These rules (e.g., ingress rules, egress rules, access control lists, etc.) are used to allow or deny network traffic based on various criteria, such as IP addresses, port numbers, protocols, and other attributes of the data packets being transmitted. Network rules are typically configured in network devices such as routers, firewalls, and gateways. Secrets refer to sensitive information that must be kept confidential to protect access to systems, applications, and data. Secrets can include passwords, encryption keys, API keys, tokens, and certificates. They are used to authenticate identities and to ensure secure communication between different components of an IT system. Network rules are about defining and enforcing the flow of traffic, while secrets are about safeguarding the credentials and keys that grant access to systems and data. Proper configuration and management of both are necessary to protect an organization's network and resources from security threats.

Current technology related to traditional firewalls fails to provide for secure egress. State management associated with current traditional firewalls typically maintains a comprehensive and often complex state of the network, including all the rules and the current status of network connections. In current traditional firewalls, scalability is an issue, as traditional systems may struggle to scale efficiently as the network grows because it needs to manage an increasing number of rules and connections. In addition, traditional firewall systems can introduce latency as it may need to consult a central database or controller to validate outbound requests. Traditional firewalls further have security vulnerabilities, as they rely on the integrity of its infrastructure and the correct configuration of its rules to ensure security. Traditional firewall systems further can be complex to implement and manage, especially in dynamic environments with frequent changes.

Prior solutions include secure egress for the developer framework, which ensures that a cloud data platform account administrator has complete control over which remote network services a service is able to connect. This applies for both account-local services, and also services installed from the native applications marketplace. A more typical solution would involve either pushing all possible egress permissions to the egress control (e.g., which has performance, latency, and cost implications) or to have the egress control check the egress by asking the trusted controller, which has latency and security implications. Prior egress solutions using sandbox egress operations can handle up-front DNS resolution; however, such operations are not practical for containers, such as FECS pods or containers that may run for multiple weeks. In addition, prior developer framework and programming environment sandbox operations, trust the execution platform host of the cloud data platform.

However, with the framework and environment container service (FECS) according to the present disclosure, the cloud data platform does not trust the worker nodes (e.g., untrusted intermediaries), which means that all enforcement must happen on the egress proxy (e.g., it cannot be trusted to happen on the worker). Untrusted intermediaries refer to entities or components within a communication or data transmission process (e.g., database system, Internet, intranet, etc.) that are not considered secure or reliable by the parties involved in the communication. These intermediaries may have the potential to intercept, modify, or redirect data without the consent or knowledge of the original parties.

According to example embodiments, External Access Integration (EAI) with the network egress access control system can be performed at the service-level (e.g., egress policies intuitively maps to a service or pod) and/or the compute pool-level (e.g., users can be explicitly deliberate about which compute pools services granted external access can run on). A cluster has access to zero or more egress pools. Each egress pool corresponds to a set of egress proxy instances. When a service or job is created, its pod specification identifies the egress pool (if any) that the service or job's pods will use. Network rules and secrets will need to be pushed down to the customer containers where the service is running to be enforced and used. For example, network rules will be translated to policy configmaps and made available to customer containers. To ensure that network rules updates are pushed down to the pod, a background job periodically checks for updates to the EAI and associated network rules and pushes the details down to the cluster. In some examples, egress destinations (e.g., EAI, network rules, etc.) and secrets are created as SQL objects and linked to a service during the creation of a service. The network egress access control system links egress destinations to the service via the 'CREATE SERVICE' SQL and has the specification simply describe what egress destinations can be employed to be reachable for the service. In contrast, secrets are linked to the specification, in order to define mounting configurations for secrets, which define how the secret is made available to the service at runtime.

In example embodiments, the network egress access control system described herein includes providing and supporting an allow-all option for container services secure egress customers by defining the allow-all option for EAI, more precisely, a service can be allowed to access an HTTP/HTTPS destination. Examples of the network egress access control system enable customers of the cloud data platform to define allow-all external access by extending the 'HOST_PORT' network rules, where egress network rules specify a list of host_ports (the destinations the network rule is meant for). Examples support the allow-all optionality by using a host "0.0.0.0" to indicate any host, where, by default, when no ports are specified, this will apply to port 443. In another example, a customer could specify host "0.0.0.0:80" to allow any host over port 80. This can be extended to a value list to support DNS wildcard syntax, such as "*.api-.google.com" or "*", where customers do not need to change the type (e.g., TYPE=HOST_PORT). For example, to support allow-all, special keywords can be used, where input validation is introduced so that if the special keyword 'ANY_HTTP_HTTPS' is used then the VALUE_LIST length must only be one. In some examples, the network egress access control system implements the allow-all option for EAI by introducing a new network rule type (e.g., "ANY_HTTP_HTTPS"), which allows for a clear separation from old network rule types such that customers who want to use allow-all have to intentionally create a new network rule with this type. For example, a customer of the cloud data platform will specify their cluster's networking configuration via a network rule and external access integration. The customer first creates a network rule, which contains an allow list for a specific destination (e.g., hostname, IP address, etc.) and a port/protocol (e.g., a network rule that allows https to translation.googleapis.com). Then, the customer creates an external access integration, which combines one or more network rules and other information, like authentication secrets.

Examples of the egress proxy associated with the network egress access control system can include egress rules for a specific IP address and port, or other identifiers, such as Classless Inter-Domain Routing (CIDR) and ports. CIDR is a method for allocating IP addresses and routing Internet Protocol packets. It is used to create unique identifiers for networks and individual devices. When the user adds a port to CIDR notation, they are specifying not just a range of IP addresses but also a specific port number on the hosts within that range. Ports are used to identify specific services or applications running on a server. For instance, 192.168.1.0/24:80 would refer to all IP addresses within the 192.168.1.0 network on port 80, which is the standard port for HTTP traffic.

In example embodiments, the network egress access control system includes supporting multiple policies per client to allow for dynamically resolving DNS. Examples include a client operatively connected with the cloud data platform to send a complete additive list and/or to rely on policy TTL to clear out old policies. The client can be a command-line tool designed for automating tasks within the cloud data platform, which provides a convenient way to manage various operations related to the cloud data platform (e.g., copying views across schemas, executing SQL queries, and more). In some examples, the egress proxy can provide for a dedicated set of egress IP addresses on a per organization (e.g., company) or per account basis.

According to examples, the FECS is part of the secure egress for the developer framework and programming environment container services, ensuring that a cloud data platform account administrator has complete control over the network services an FECS service can connect to. The FECS solution presented throughout addresses the problem of controlling network egress in a manner that allows an FECS service to connect only to approved remote network services. This includes both account-local services and services installed from a native applications marketplace. The system consists of four sub-systems or sub-processes, including: a service controller, a cluster egress controller, a worker node egress controller, and an egress proxy that interact to provide secure egress for the developer framework and programming environment container service, referred to as a framework and environment container service (FECS). Examples further use sandbox external access and additional specifications for egress based on the design considerations for long-lived containers, untrusted worker nodes, and containers with large network interfaces that include the use of allow-all/any access, Domain Name System (DNS) wildcard specifications, and network bandwidth billing. Examples provide a new solution where all of the egress constraints for a given compute worker node, such as a virtual machine (VM), are passed from the trusted controller through the untrusted worker to the trusted egress proxy, providing both DNS and IP based egress controls. This is done leveraging cryptographic signatures, so that the trusted application controller can grant access from a container to a destination (e.g., Transmission Control Protocol (TCP) access to port 80 on app.mycompany.com), that grant can be used by the container to ask for DNS resolution of app.mycompany-.com, which provides an updated grant to allow access to the resolved IP Address (e.g., on TCP port 80, 443, etc.), and that final grant can be used by the instance to request network egress to that host and port.

Example embodiments extend existing external access services egress (e.g., connections initiated from a cloud data platform service container) with a destination outside of the cloud data platform and/or the cloud service's control. This extension of egress specifications provides a strong security boundary between cloud data platform service worker nodes and external networks, which provide the cloud data platform and customers of the cloud data platform with greater control and visibility of this network traffic. The developer framework and programming environment container service in the cloud data platform allows users to deploy, manage, and scale containerized applications within the cloud data platform ecosystem. The container services include fully managed container offerings provided by the cloud data platform that enables the user to easily work with containerized services, jobs, and functions while staying within the security and governance boundaries of the cloud data platform (e.g., requiring zero data movement, ensuring seamless integration with the user's existing cloud data platform environment). The container service according to examples of the present disclosure provides for services, which include long-running containerized applications that do not automatically end. The cloud data platform manages the running service, ensuring uninterrupted execution (and even if a service container stops, the cloud data platform restarts it automatically). As container service services add additional specifications to existing external access egress specifications, example embodiments provide for functionality with long-lived containers, untrusted workers, containers with very large network interfaces (e.g., p4d.24×large has 400 Gbps (4×100 Gbs) network bandwidth), enabling allow-all/allow-any operations, DNS wildcard capabilities, network bandwidth billing, and the like.

Example embodiments of the present disclosure overcome the existing problems with firewall systems by using a nearly stateless approach to state management where the necessary information to validate an egress request is embedded within cryptographically signed tokens, reducing the complexity of state management. According to some examples, stateful inspection is used to monitor the state of active connections and make decisions about which network packets to allow through the firewall based on network egress access control with untrusted intermediaries. Examples are designed for scalability, as the stateless nature and use of cryptographic signatures simplify the process of scaling up, and further reduces latency by allowing immediate validation of requests without the need for external checks according to the self-contained signed policies. Examples further overcome security issues with traditional firewalls by enhancing security by using cryptographic signatures, ensuring that policies cannot be tampered with by untrusted intermediaries. Examples further overcome the complexity of implementation of traditional firewalls by offering a simplified implementation by avoiding the need to push all possible permissions to the control point or to have the control point query a trusted controller.

Examples offer a multitude of enhancements over extant methodologies, encapsulating the following salient attributes including optimized state management, enhanced scalability, latency mitigation, robust security measures, streamlined implementation, and more. The solution presented by the FECS service allows egress constraints for compute work node(s) to be passed through an untrusted worker to a trusted egress controller using, for example, cryptographic signatures, which simplifies scalability and reduces latency compared to typical solutions. For example, the inventive construct facilitates an egress control schema that necessitates a minimalistic retention of state. This optimization is attributed to the strategic employment of cryptographic signatures, which obviates the exigency for voluminous state retention. The architectural blueprint augments the scalability of the egress control framework. The diminution of state requisites engenders an environment conducive to augmenting the system's capacity to accommodate an escalated quantum of nodes or network traffic, all while mitigating the amplification of infrastructural complexity or resource allocation. The engineered system is adept at curtailing latency by ensuring the immediate availability of requisite state for the validation of egress petitions. This is in stark contrast to alternative paradigms that may mandate interaction with a centralized control entity, thereby inducing latency. The incorporation of cryptographic signatures for the conveyance of egress constraints fortifies the system against the potential compromise of worker nodes. Such nodes, even in the absence of trust, are precluded from adulterating or fabricating egress directives, thereby imbuing the system with a security layer that is impervious to the integrity of intermediary nodes.

Example embodiments overcome additional technical challenges in three ways. First, all network traffic, initiated by a container or pod, will either be encapsulated by a CNI for within-cluster communications or GENEVE encapsulated and routed to the egress proxies (or sent to one of a small list of allowed destinations). Second, using tokens in the network egress access control system, the system provides a flexible and extensible mechanism for communicating what is allowed in a way that can be easily extended over time using signed JSON tokens that are validated themselves and then used to validate all outgoing traffic (both DNS and TCP). Third, having active proxies for both DNS and TCP egress provides opportunities to log and monitor untrusted intermediaries to provide future risk mitigation. The system's design predicates a more lucid and coherent implementation of egress controls. By circumventing the necessity to promulgate an exhaustive compendium of egress permissions to the egress control or to predicate egress control validation on queries to a trusted controller, the system eschews the conventional performance, latency, and security compromises. Example embodiments provide additional security guarantees not found in existing technologies. For example, the network egress access control system does not trust worker nodes (e.g., untrusted intermediaries), so the system ensures that all Internet-bound communication is validated against policies (e.g., specified by compute service manager, or the like). The worker nodes do not have direct access to the Internet, instead all Internet access is via an egress proxy. All egress through the egress proxy is validated against a signed egress policy, and all DNS is validated against DNS policies. Example embodiments provide for multiple forms of egress policies, such as DNS policies, IP policies, pinned policies, and the like. Collectively, these advancements coalesce to forge a network egress control system that is markedly more efficacious, secure, and administrable, particularly germane in contexts where containerized services necessitate secure conduits to external network resources.

Examples of the present disclosure, when implemented according to methods described throughout, allow for nearly stateless egress control implementation (e.g., only state included is the public key used to validate the cryptographic signatures). This dramatically simplifies scalability of the egress control implementation, as well as also reducing latency because the egress control has all the state provided to validate an egress request. Examples of the system include the four subsystems for secure egress. The service controller subsystem is a component that schedules and manages execution of services, in this context it also takes the customer account administrator's egress policies and translates them to cryptographically signed egress policies. The cluster egress controller subsystem handles validation of DNS requests from services and updates signed egress policies with specific VM IP address and egress target IP addresses (e.g., as resolved by the DNS request(s)). The worker/node egress controller subsystem translates and/or encapsulates service DNS and network traffic to the cluster egress controller (e.g., for DNS) and egress proxy (e.g., for network traffic) so that service implementation does not need to understand how secure egress implementation works. In other words, the worker/node egress controller implementation is transparent (e.g., appears transparent) to customer services.

The egress proxy subsystem takes egress policies and egress network traffic from workers validates the policies and implements the egress network rules described by the policies to allow and/or deny egress network traffic to external network resources, and route return traffic from those external resources back to the appropriate service. According to examples, network rules are extended from previously used techniques in a multitude of ways, including, for example, extending existing HOST_PORT type in network rule, and introducing a new network rule type (e.g., ANY_HTTP_HTTPS).

For purposes of this description, example embodiments can apply to a User-Defined Function (UDF), User-Defined Table Function (UDTF), User-Defined Aggregation Function (UDAF), external functions, web application engines such as Streamlit®, or other stored procedures used in relational databases for performing complex data processing tasks, enforcing business rules, and the like can be applied or employed according to the present disclosure. However, for simplicity, the detailed embodiments will describe examples of providing secure external access to the UDF executing within a sandbox environment directly to the Internet using familiar programming languages (e.g., Java, Scala, Python, etc.), but it will be understood that the same principles may be used for other types of database logic and programmatic constructs from a sandboxed environment or a non-sandboxed environment. For example, although example embodiments describe external access of user-defined functions in a sandboxed environment, similar logic can be applied to non-sandboxed environments, such as external access of user-defined functions in containerized environments, or other constructs of the cloud data platform.

In computer security, a sandbox (e.g., sandbox environment) is a security mechanism for separating running programs, usually to prevent system failures or prevent exploitation of software vulnerabilities. A sandbox can be used to execute untested or untrusted packages, programs, functions, or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system or read from input devices can be disallowed or restricted. UDFs typically can run in a sandbox environment. Some example embodiments described herein can be run within a sandbox environment, which is described and depicted in more detail in connection with FIG. 4.

FIG. 1 illustrates an example computing environment 100 that includes a database system in the example form of a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the cloud data platform 102 in communication with a cloud storage platform 104 (e.g., AWS®, Microsoft Azure Blob Storage®, or Google® Cloud Storage). The cloud data platform 102 is a network-based system used for reporting and analysis of integrated data from one or more disparate sources including one or more storage locations within the cloud storage platform 104. The cloud data platform 102 can be a network-based data platform or network-based data system. The cloud storage platform 104 comprises a plurality of computing machines and provides on-demand computer system resources such as data storage and computing power to the cloud data platform 102.

The cloud data platform 102 comprises a compute service manager 108, an execution platform 110, a network egress access control system 101, a proxy resource manager 150, and one or more metadata databases 112. The cloud data platform 102 hosts and provides data reporting and analysis services to multiple client accounts. As described further herein, a proxy resource manager 150 can perform load balancing operation in connection with availability zones (AZ) (as mentioned further herein) including different clusters of instances of compute service managers with varying computing resources (e.g., different virtual warehouses, and the like). The proxy resource manager 150 in communication with instances of compute service manager 108 clusters in different availability zones. In some embodiments, the proxy resource manager 150 may access one of compute service manager clusters using a data communication network such as the Internet. In some implementations, a client account may specify that the proxy resource manager 150 (configured for storing internal jobs to be completed) should interact with a particular virtual warehouse at a particular time. The proxy resource manager 150 can further interact directly with the network egress access control system 101. In an embodiment, the proxy resource manager 150 receives data retrieval, data storage, and data processing requests. In response to such requests, the proxy resource manager 150 routes the requests to an appropriate availability zone with an appropriate compute service manager cluster.

In some examples, the proxy resource manager 150 includes availability zone awareness. For example, within a given deployment, proxies can be deployed in multiple different availability zones, where sending traffic from one AZ to another AZ incurs increased cloud storage provider networking costs, so secure egress according to examples herein can avoid using proxies from other AZs when possible. AZ awareness includes a reconciler, such as a compute service manager 108, to push down proxy lists per AZ, where the reconciler can push the list of available proxies to one or more key-value stores (e.g., a compute service manager metadata query engine) for querying from the compute service manager 108 background job. In addition to this information, the compute service manager 108 can push which AZ the proxies are running in. The compute service manager 108 then creates a proxy list per AZ in the egress policy configmap (described below). AZ awareness is further achieved by enabling customer pods to be AZ aware.

For example, the customer pod (described and depicted in connection with FIG. 6) will be provided with information to know which AZ the customer pod is running in. In some examples, the AZ awareness includes the compute service manager 108 communicating with an egress sidecar (not shown), where the egress sidecar considers AZ in proxy list updates. For example, the egress sidecar can decide which proxies to use from the egress policy configmap based on the AZ the pod is located in. The egress sidecar can perform multiple functions. For example, if there are more than one proxies in a local AZ, then the egress sidecar can register only those proxies in the local AZ, where all traffic will go to proxies in the local AZ, thereby incurring no additional costs. In another example, if there are no proxies in the local AZ (e.g., because they all have too high a load, they have failed, none were deployed in the AZ, etc.), then the egress sidecar can register the aggregate of all proxies in the non-local AZs. In some examples, the network egress access control system can prefer the egress proxy (described and depicted in connection with FIG. 6) in the local AZ. In some examples, the network egress access control system can initially ignore the AZ and simply concatenate the IPs. In some examples, the network egress access control system can identify preferences and use the AZ local proxies.

The compute service manager 108 coordinates and manages operations of the cloud data platform 102. The compute service manager 108 is connected with a network egress access control system 101 (described and depicted in detail in connection with FIG. 5), which is in turn connected with the proxy service 115. The network egress access control system 101 manages and restricts the outbound network traffic from a computer network or system to the Internet or other external networks. In simpler terms, the network egress access control system 101 is like a security guard that decides which data is allowed to leave the company's (e.g., cloud data platform user) computer systems and access the outside world. This helps prevent unauthorized transmission of sensitive information and ensures that only safe and permitted connections are made from the company's network to external services. The system, by having all the necessary state available to validate an egress request immediately, refers to the system's ability to quickly and efficiently determine whether a request to access an external network service is allowed. As used herein, the term "state" refers to the information used to make a decision about network egress. This could include details such as which external services a particular container is permitted to communicate with, the specific network ports that can be used, and any other rules that define the allowed network interactions. The network egress access control system 101 is illustrated as a component of the cloud data platform 101, but can similarly be a proxy service operatively connected to one or more components of the cloud data platform 102.

The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108. In particular implementations, a compute service manager 108 can support any number of client accounts (not shown) such as end users corresponding to respective one or more of client device 114 that provide data storage and retrieval requests, system administrators managing the systems and methods described herein, and other components/devices that interact with the compute service manager. As used herein, a compute service manager may also be referred to as a "global services system" that performs various functions as discussed herein, and each of compute service manager 108 can include multiple compute service managers that can correspond to a particular cluster (or clusters) of computing resources.

The compute service manager 108 is also in communication with a client device 114. The client device 114 corresponds to a user of one of the multiple client accounts supported by the cloud data platform 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the cloud data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N can be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (e.g., as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

The compute service manager 108, metadata database(s) 112, proxy resource manager 150, and execution platform 110 are operatively connected to a platform agent 109, which provides for an agent in the execution platform 110 as a long running service to handle extended Berkeley Packet Filter (eBPF) related operations. The platform agent 109 can include a Remote Procedure Call (RPC) server via a Unix domain socket that can handle requests sent from execution platform worker processes. Sample requests can include load specific eBPF programs, read/write to BPF maps, configure network devices, and the like. The platform agent 109 can further handle external access BPF code and can be extended to capture more BPF uses cases, while receiving relevant cloud data platform information from any of the compute service manager 108, metadata database(s) 112, proxy service 115, execution platform 110, or alternative operatively connected modules from within the cloud data platform 102, or externally connected data sources. The platform agent 109 is depicted and described in combination with FIG. 6.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol. In some embodiments, the compute service manager 108 or other elements of the cloud data platform 102, can perform the actions of the proxy resource manager 150.

The compute service manager 108, metadata database(s) 112, execution platform 110, platform agent 109, proxy resource manager 150, and cloud storage platform 104 are shown in FIG. 1 as individual discrete components. However, each of the compute service manager 108, metadata database(s) 112, proxy service 115, execution platform 110, platform agent 109, and cloud storage platform 104 can be implemented as a distributed system (e.g., distributed across multiple systems/platforms at multiple geographic locations). Additionally, each of the compute service manager 108, metadata database(s) 112, execution platform 110, platform agent 109, proxy service 115, and cloud storage platform 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a suitable candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

The platform agent 109 is illustrated as a component of execution platform 110; however, additional example embodiments of the platform agent 109 can be implemented by any of the virtual warehouses of the execution platform 110, such as the execution node 302-1, compute service manager 108, the request processing service 208, the security manager 422, and/or external components of the cloud data platform 102 in accordance with some embodiments of the present disclosure.

Figure 2:
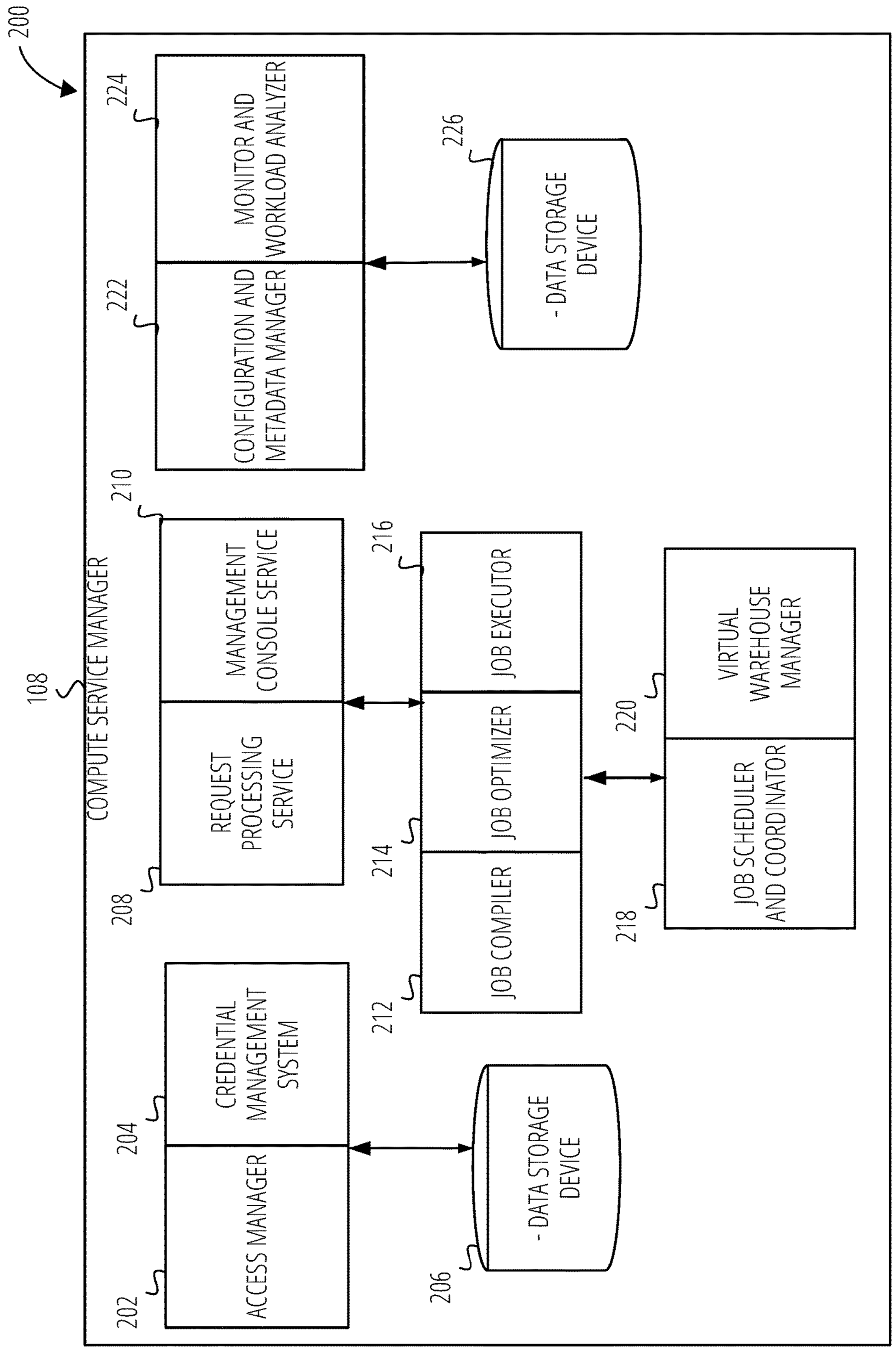
FIG. 2 is a block diagram illustrating components of a compute service manager, according to some example embodiments.

FIG. 2 is a block diagram 200 illustrating components of the compute service manager 108, in accordance with some embodiments of the present disclosure. As shown in FIG. 2, the compute service manager 108 includes an access manager 202 and a credential management system 204 coupled to access data storage device 206, which is an example of the metadata database(s) 112.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216.

The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs can be prioritized and then processed in that prioritized order. In an embodiment, the job scheduler and coordinator 218 determines a priority for internal jobs that are scheduled by the compute service manager 108 with other "outside" jobs such as user queries that can be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the cloud data platform 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
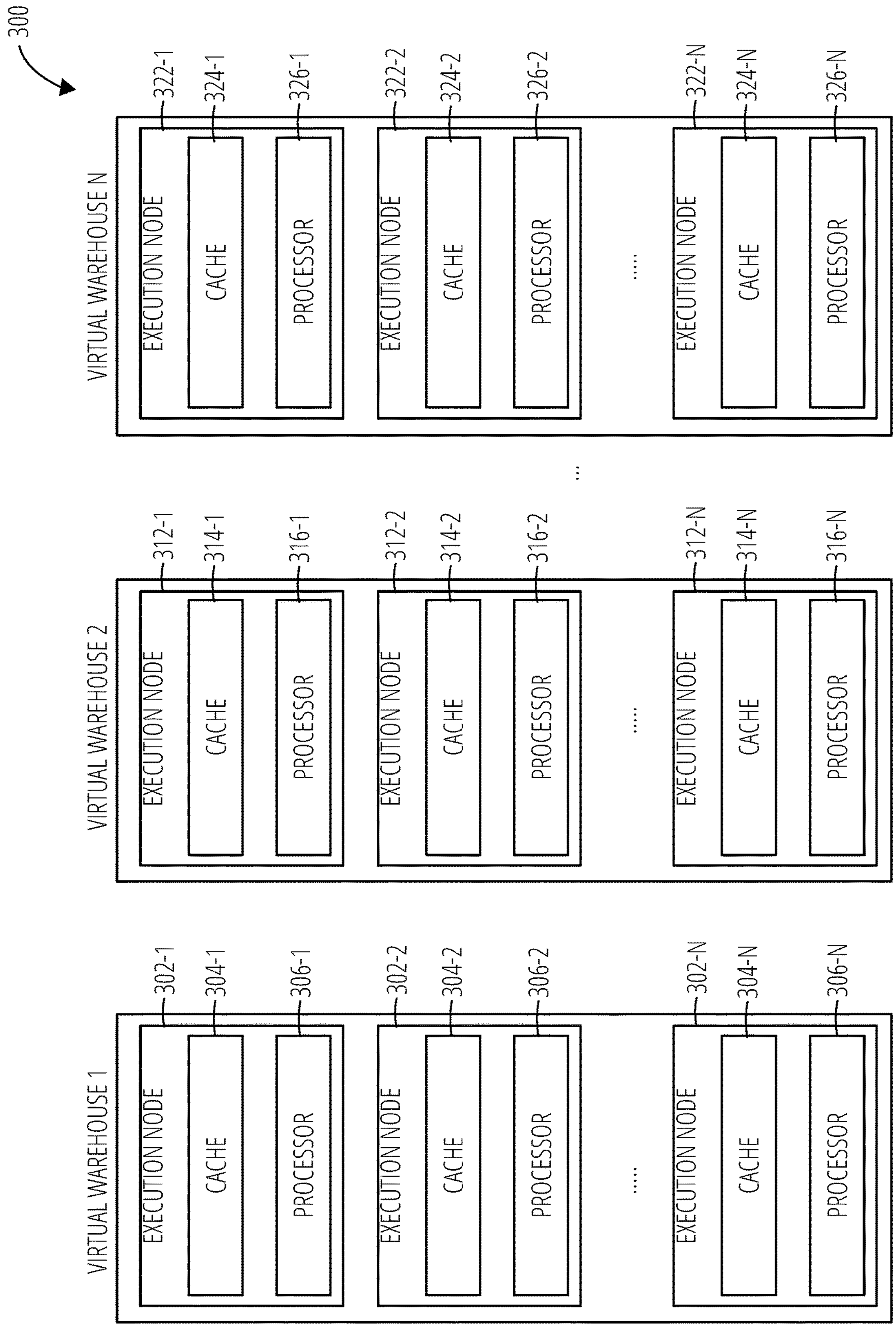
FIG. 3 is a block diagram illustrating components of an execution platform, according to some example embodiments.

FIG. 3 is a block diagram 300 illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that use significant computing resources. Another execution node may contain significant cache resources and minimal computing resources, making this execution node useful for tasks that employ caching of large amounts of data. Yet another execution node may contain cache resources providing faster input-output operations, useful for tasks that use fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node use a larger cache capacity.

Although virtual warehouses 1, 2, and N are associated with the same execution platform 110, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource specifications and cache specifications), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location. A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
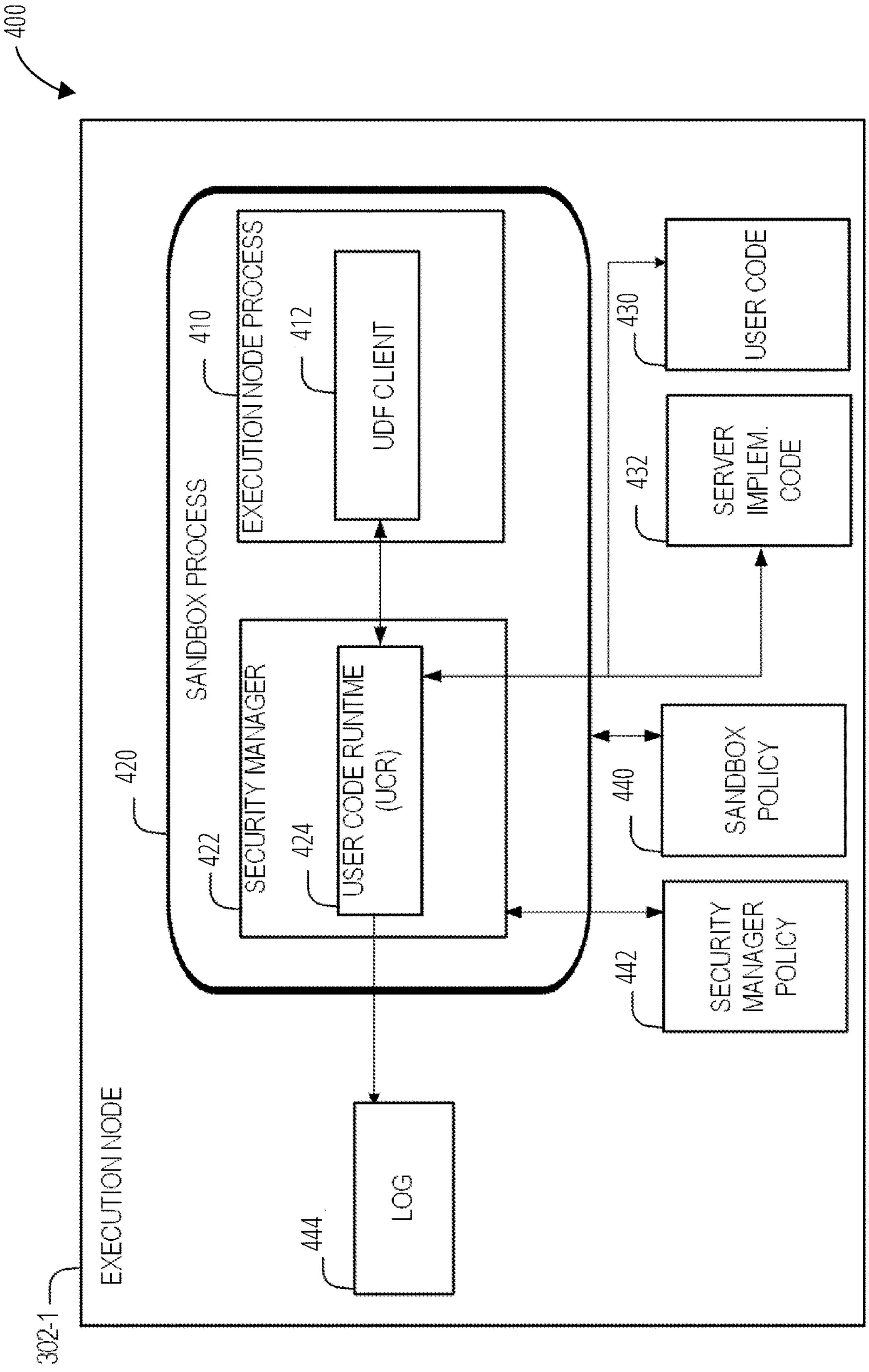
FIG. 4 is a computing environment conceptually illustrating an example software architecture executing a user-defined function (UDF) by a process running on a given execution node of the execution platform, according to some example embodiments.

FIG. 4 is a computing environment 400 conceptually illustrating an example software architecture executing a user-defined function (UDF) by a process running on a given execution node of the execution platform 110 of FIG. 3, in accordance with some embodiments of the present disclosure.

As illustrated, the execution node 302-1 from the execution platform 110 includes an execution node process 410, which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 312-1), but the security mechanisms described herein can disallow communication with a third execution node (e.g., execution node 322-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one with the same or fewer potential security exploits).

User code 430 may be provided as a package, e.g., in the form of a JAR (JAVA archive) file, which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA-based UDF) can be performed by a user code runtime 424 executing within a sandbox process 420. In an embodiment, the user code runtime 424 is implemented as a virtual machine, such as a JAVA virtual machine (JVM). Since the user code runtime 424 executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the cloud storage platform 104.

Examples of the log 444 can include logging for observability and debuggability. Logging can be automatically configured to observe egress traffic using a logging mechanism with runtime-configurable verbosity levels. For example, use of an event output log or event output helper can allow for passing custom structs from the eBPF program to a performance event ring buffer along with an optional packet sample. In response, the execution platform worker can pull the logs from log 444 or other logs from the buffer and write to execution platform logs, as an example. This channel can be used to log, debug, sample, and/or push notifications for network policy violations and the like. For example, the event output log or helper can be configured to pass the data through a lockless memory mapped per-CPU performance ring buffer, which is significantly faster (e.g., more efficient) than default logging support in eBPF.

Additional examples of the log 444 or other logs of the cloud data platform 102 can be used to provide clear and actionable feedback necessary for users if their UDF's packet has been blocked. With the logging mechanism, the cloud data platform 102 or component thereof can report details back to the user (e.g., which IP and port has been blocked or violated the account policy). Additionally, when an unauthorized DNS request has been blocked, the eBPF program can intercept the packet and report back which hostname it tried to access and enter such information into the log 444, which is valuable for helping customers to troubleshoot and debug their UDF.

Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa).

Security manager 422, in an example, can prevent completion of an operation from a given UDF by throwing an exception (e.g., if the operation is not permitted), or returns (e.g., doing nothing) if the operation is permitted. In an implementation, the security manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

For example, the instance of a computer program can be instantiated by the execution platform 110. For example, the execution node 302-1 can be configured for instantiating a user code runtime to execute the code of the UDF and/or to create a runtime environment that allows the user's code to be executed. The user code runtime can include an access control process including an access control list, where the access control list includes authorized hosts and access usage rights or other types of allow lists and/or blocklists with access control information. Instantiating a sandbox process can determine whether the UDF is permitted and instantiating the user code runtime as a child process of the sandbox process, the sandbox process configured to execute the at least one operation in a sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, inter-process communication, and the like) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., an object-oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

Figure 5:
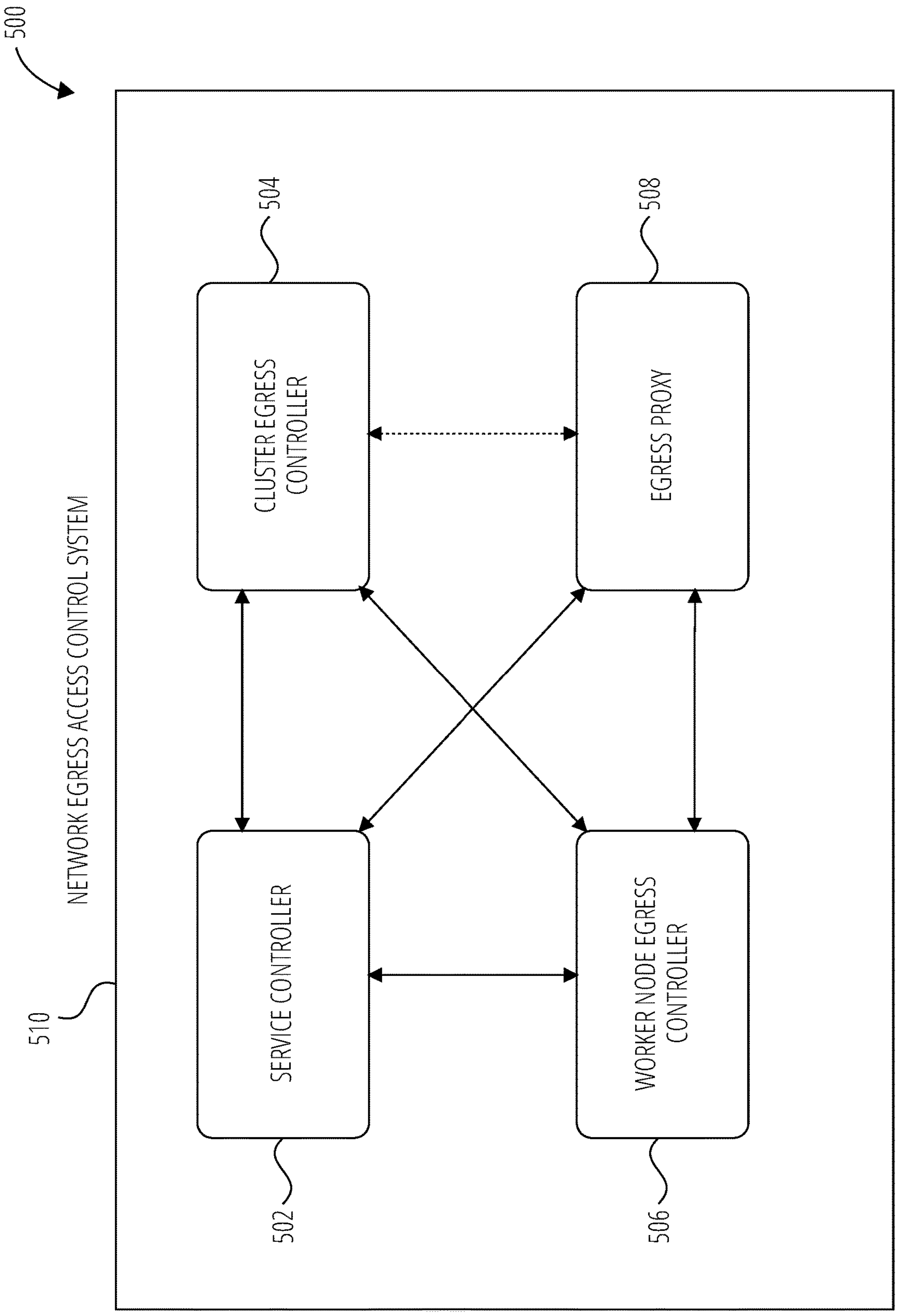
FIG. 5 illustrates subsystems of a network egress access control system with untrusted intermediaries, according to some example embodiments.

FIG. 5 is a block diagram 500 illustrating subsystems of a network egress access control system 510 (also referred to as "an egress control system") with untrusted intermediaries, according to some example embodiments.

Example embodiments of the network egress access control system 510, such as the network egress access control system 101 as described and depicted in connection with FIG. 1, consists of four subsystems or sub-processes, including: a service controller 502, a cluster egress controller 504, a worker node egress controller 506, and an egress proxy 508. The subsystems interact to provide secure egress for the developer framework and programming environment container service, referred to as a framework and environment container service (FECS) or simply a "container service (CS)."

Examples of the network egress access control system 510 use cryptographic signatures as a key part of its egress control strategy by employing policy creation, cryptographic signatures, distribution of policies, and immediate validation that is efficient and secure. For example, the network egress access control system 510 starts with a trusted component, like the service controller 502, creating a set of egress policies. These policies, for example, specify the rules for what network traffic is allowed out of the system. These policies are then signed cryptographically, which means they are encoded in a way that ensures they have not been tampered with and are authentic. The signed policies are distributed to the parts of the network egress access control system 510 that will enforce them, such as an egress proxy 508.

When a container within the network egress access control system 510 wants to send data (e.g., a packet, information, etc.) to an external service (e.g., an egress request), the egress proxy 508 can immediately check the request against the signed policies. Because the policies are signed and contain all the necessary information (e.g., the "state"), the egress proxy 508 can validate the request on the spot without needing to ask another system for permission or additional information. This process is efficient because it does not require a round-trip communication with a central authority to validate each request. This process is secure because the cryptographic signatures prevent tampering, ensuring that only traffic that complies with the established rules is allowed to pass through. In some examples, the network egress access control system 510 design including multiple subsystems 502/504/506/508 provides that all the information needed to make a decision about network egress is embedded within the signed policies themselves, allowing for immediate and secure validation of egress requests.

The service controller 502 is a component of the network egress access control system 510 that schedules and manages execution of services. In some examples, the service controller 502 can take a customer account administrator's egress policies and translate the policies to cryptographically signed egress policies.

The cluster egress controller 504 acts as a liaison for egress policies pushed by the service controller. The worker node egress controller 506 handles validation of DNS requests from services and updates signed egress policies with specific worker virtual machine (VM) IP address and egress target IPs (as resolved by DNS requests). The worker node egress controller 506 includes multiple responsibilities, including: (1) to perform IP Address Management (IPAM) to ensure external access virtual Ethernets (veths) have node-level IP uniqueness, (2) to install and manage eBPF programs on customer pod veths, where these eBPF programs forward packets from the customer pods to the egress proxies, and (3) to forward policy registration requests to the egress proxies. In some examples, the worker node egress controller 506 can be considered part of a Container Network Interface (CNI) and acts as the liaison between the customer pod (e.g., container) and the egress proxies (CNI is described and depicted in connection with FIG. 6). In some examples, the worker node egress controller 506 is a central management entity responsible for making global decisions about the cluster and responding to cluster events.

An example embodiment of the network egress access control system 510 uses Kubernetes pods. Kubernetes is an open-source platform designed to automate the deployment, scaling, and operation of application containers across clusters of hosts. It will be understood by those having ordinary skill in the art that Kubernetes is used for exemplary purposes throughout the specification; however, other platforms and/or methods for handling containers may similarly be applied to the instant examples. A pod is the smallest deployable unit that can be created and managed, which is a group of one or more containers that are deployed together on the same host. Pods are commonly used to run instances of applications or services. According to examples, the use of "customer pod" or "customer container" can be considered interchangeably. For example, a customer container is an individual, lightweight, and portable unit of software that contains an application and all its dependencies, which are designed to run consistently across different computing environments (e.g., database systems, etc.). The customer container encapsulates an application's code, runtime, system tools, and the like, as well as provide for efficient resource usage and immutability.

In general terms, the egress controllers (e.g., cluster egress controller 504) runs on the control plane node. The worker node egress controller 506 runs as agents on all worker nodes and control plane nodes of the customer cluster (described and depicted in connection with FIG. 6); for example, the worker node egress controller runs on all nodes (e.g., both controller and worker). In some embodiments, the worker node egress controller is a node egress controller. The node egress daemon runs in host networking mode that allows it to manage the networking devices on the host. In some embodiments the worker node egress controller 506 and/or the cluster egress controller 504 can run in host networking mode. Similarly, is it possible for the cluster egress controller to run anywhere other than on the control plane node, in some embodiments, when the node is trusted and the customer cannot break out of their container, then it can run anywhere without compromising security.

Moreover, egress controllers consist of initialization scripts (e.g., bootstrap process, setup script, etc.) that are executed prior to the main applications or service starting with the purpose of preparing the environment, performing initial configurations, and/or ensuring that certain prerequisites are met. In more specific examples, the initialization scripts serve a similar purpose to init containers in Kubernetes, which are used throughout the present disclosure for exemplary purposes and not limitation. The egress controller runs as a background process(es), such as an agent, daemon, or in Kubernetes terms, a DaemonSet, on all worker and control plane nodes of the customer cluster. It runs in host networking mode, which allows it to manage the networking devices on the host.

In some examples, where the network egress access control system 510 uses Kubernetes, the DaemonSet consists of an init container, whose sole responsibility is to copy the CNI binary into the correct location on the node, and a main container, which exposes APIs for initializing a pod and registering policies. An init container is a special type of container that is used in a Kubernetes pod. It is designed to run before the application containers are started and must complete successfully before the main containers of the pod are allowed to run. Init containers are useful for tasks that should be done before the application container starts. The init container is responsible for initializing the egress proxies in such a way that the customer pod can access any of its pre-configured IP policies immediately when it starts up. In some examples, the CNI waits for the policies to propagate before letting the container start (e.g., rather than having an init container). The init container, for example, can read the egress configuration map and perform a series of actions. For example, the init container can update the proxy list in the egress controller and pin any pre-configured IP policies by calling into the pinning service, and then register any successfully pinned policies on the egress proxies.

The worker node egress controller 506 is a component of the network egress access control system 510 that translates and encapsulates service DNS and network traffic to the cluster egress controller 504 (for DNS) and to the egress proxy 508 (for network traffic) so that service implementation does not need to understand how secure egress implementation works (e.g., the implementation appears to be transparent to customer services).

The egress proxy 508 is a component of the network egress access control system 510 that takes egress policies and egress network traffic from workers in order to validate the policies and implement the egress network rules described by the policies to allow or deny egress network traffic to external network resources. The egress proxy 508 also routes return traffic from those external resources back to the appropriate service. The egress proxy 508 also leverages a reconciler, which exposes APIs to components of the cloud data platform 102, such as the compute service manager 108. The reconciler can call to query the health of the egress proxy fleet. The egress proxy 508 acts as a gatekeeper for internet-bound traffic from FECS pods, enforcing egress policies on the outbound traffic. The egress proxy 508 can perform multiple responsibilities. The egress proxy 508 performs policy enforcement on incoming GENEVE encapsulated packets and performs SNAT on outbound traffic and DNAT on inbound traffic to proxy traffic between the sandbox and the internet destination. The egress proxies run as pods inside of the cloud data platform 102 application cluster. They run as a DaemonSet and are the only application running on a given node, so it has the full capacity of the node to use for network traffic. Moreover, like the egress controller, the egress proxy 508 runs in host networking to allow it to manage the networking devices on the host. The proxy consists of the exact same components as the egress controller (e.g., agent and eBPF code), however the main difference is that it does not perform IPAM or install eBPF code on veths. In some examples, it only has a GENEVE device that does decapsulation/policy enforcement and then can send the traffic directly to the internet.

IPAM refers to the mechanism for allocating IPs from a predefined subnet to be assigned to the veth devices created by both the main CNI (e.g., Cilium or Calico) and the custom CNI. For intra-cluster communications, the main CNI allocates IPs that are unique across the cluster. In some examples without these unique IP allocations, then it would be impossible to determine which pod to send a packet to when there are multiple pods on the network with the same IP address. The custom CNI, on the other hand, only needs to allocate IP addresses that are unique within the node. This is because, with a combination of SNAT and GENEVE tunneling, the egress controller and proxy can determine definitively which node a specific connection originated from, irrespective of the pod's IP address. As mentioned with reference to the CNI plugin, the custom CNI delegates IPAM to the egress controller running on the node, which tracks which IP addresses have already been allocated and allocates new IP addresses from a predefined subnet.

In some examples, for handling policy registration, the policy agent will maintain a policy map. The policy agent will then program an eBPF map with the entry format of {PolicyKey: 1}. The PolicyKey format allows the proxy to validate a packet is accessing an allowed destination and is originating from an allowed node. In some examples, these maps (e.g., configmaps) may have to lock to avoid races. When the egress proxy 508 receives a RegisterPolicies( ) request, it will perform a series of actions. First, the egress proxy 508 validates that the policy is of the correct type (e.g., pinned IP policy) and is correctly signed. Second, for each unique endpoint (e.g., dst IP+dst port+protocol), the egress proxy 508 will create or update the policy map entry in the policy agent's map, which is used by the agent for tracking TTL ("Time to Live") to specify the duration (e.g., in seconds) that a DNS record is considered valid. The egress proxy 614, or component thereof, keeps track of the TTL values for DNS records or network policies to ensure that the information is current and that any expired entries are refreshed or removed as needed to maintain the integrity and accuracy of the network routing and policy enforcement. Next, it will add any new policies to the eBPF policy map.

When the egress proxy 508 receives an UnregisterPolicies( ) request, it will perform a series of deletions. First, the egress proxy 508 will delete all policies from the eBPF map for the given enforcement ID. Second, the egress proxy 508 will delete all policies from the policy agent's policy map. In some examples, periodically (e.g., on the order of <1 second), the policy agent will iterate over its policy map and identify any expired policies. It will then remove these policies by removing the corresponding entry in the user-space and eBPF policy maps. In some examples, this same logic for policy registration and deregistration can also be applied on the cluster egress controller 504.

In some examples, the network egress access control system 510 guarantees intra-node IP address uniqueness. For example, each IP address must be unique within the node, even between those IP addresses allocated by the main and custom CNIs. To guarantee this uniqueness, the main and custom CNIs will allocate IP addresses from different subnets. The two subnets, for example, would be 172.16.0.0/12 for the custom CNI and 10.224.x.x for the main CNI; for example, a CIDR range could be 10.244.0.0/16 . . . . However, in other examples, other ranges can be used. This would give the custom CNI the ability to allocate 1,048,572 unique IP addresses before exhausting the subnet range. In some examples, the main CNI is able to reuse previously allocated IP addresses; so, while some examples have to maintain IP address uniqueness across all nodes in the cluster, they will not exhaust their range assuming the number of concurrent pods does not exceed the number of IP addresses in its subnet range. Additionally, both of these subnet ranges must not conflict with the cloud data platform 102 services node subnet, which is typically the 10.0.0.0/8 range, for example and not limitation. In some examples, assigning node and pod IP addresses from the same subnet range will cause IP address conflicts.

It will be understood by those having ordinary skill in the art that GENEVE encapsulation is used for exemplary purposes throughout the specification; however, other encapsulation methods may similarly be applied to the instant examples.

Figure 6:
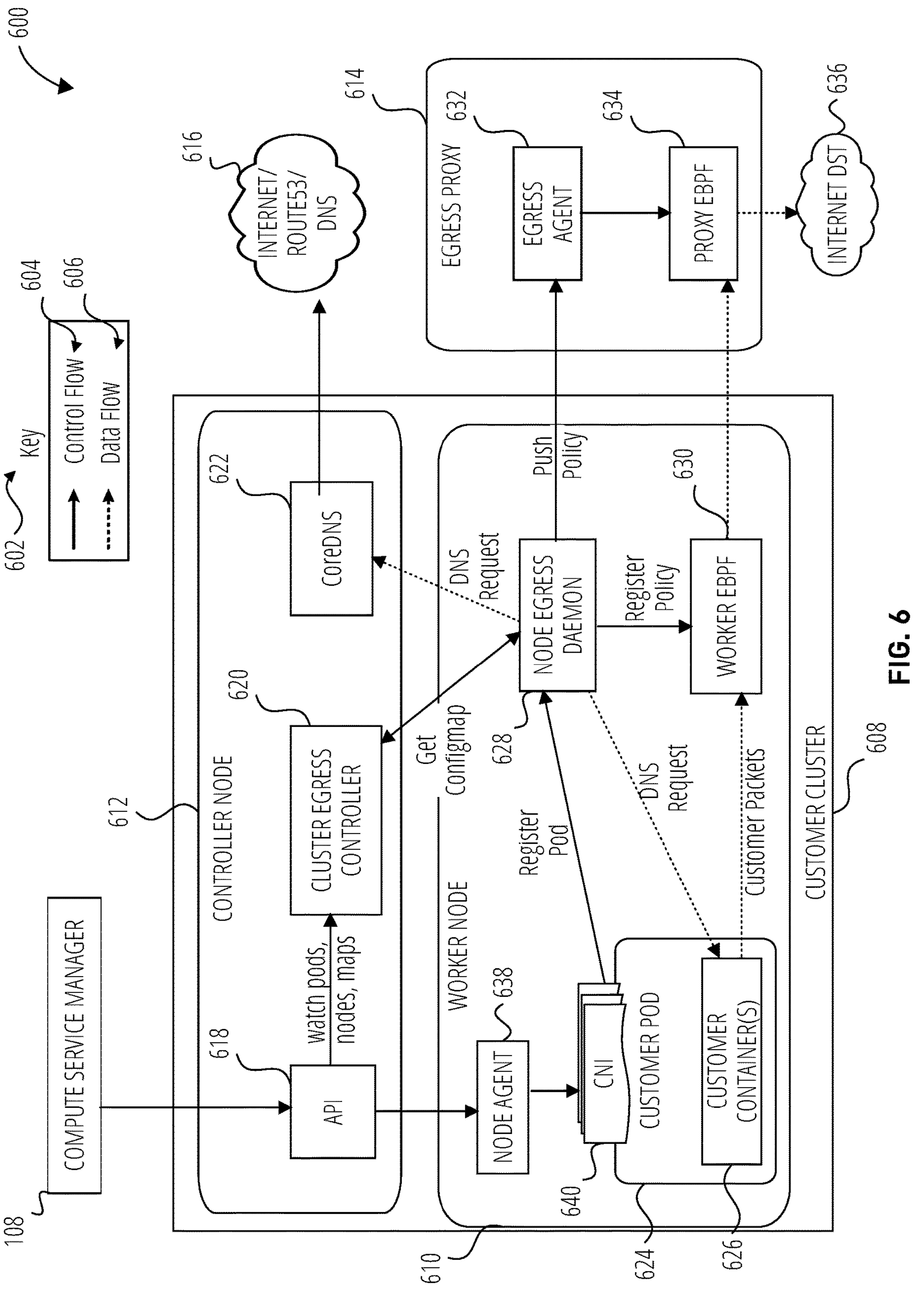
FIG. 6 is a block diagram illustrating an architecture depicting an external access system including control flows and data flows within the system, according to some example embodiments.

FIG. 6 is a block diagram 600 illustrating an architecture depicting an external access system including control flows 604 and data flows 606 within the system, in accordance with example embodiments.

The block diagram 600 includes a compute service manager 108 operatively interconnected to a customer cluster 608, which includes a controller node 612 and a worker node 610 that pushes policies to an egress proxy 614.

Examples of the customer cluster 608 consists of multiple nodes (e.g., machines, virtual machines, etc.) that can include both control plane nodes such as controller node 612 for managing the cluster state and worker nodes such as worker node 610 for running application workloads. The customer cluster 608 can include a cluster that is dedicated to a single customer of the cloud data platform, often in a multi-tenant environment where different customers of the cloud data platform have their own isolated clusters. For example, a customer cluster 608 can refer to a group of database nodes or instances that are dedicated to serving a particular customer or group of customers. For customers with larger or more demanding workloads, a dedicated cluster can be provided such that the customer has a set of database servers (e.g., nodes) that are exclusively used for their data and applications. In some examples, a customer cluster in a database system is a configuration that groups database resources to serve a specific customer or set of customers, often with the goals of providing dedicated resources, ensuring data isolation, and meeting specific service level agreements (SLAs). The customer cluster 608 includes a set of compute resources that are grouped together to run applications.

The controller node 612 can include a machine that runs control plane components, such as an API server (e.g., front-end for control plane), scheduler, cluster database, and the like. The controller node 612 is responsible for making global decisions about the cluster, as well as detecting and responding to cluster events. For example, the controller node 612 can refer to a central unit within the cloud data platform (e.g., distributed system, database system, network, etc.) that manages and directs other nodes and/or components. The controller node 612 can monitor for newly created containers or pods with no assigned node and select a node for them to run on. In some examples, there may be multiple controller nodes to ensure that the cluster remains operational even if one controller node fails. In some examples, the controller node 612 can include a device or software that manages network resources, handling tasks like traffic management, routing, policy enforcement, and the like. In some examples of a database system, the controller node 612 can be a primary server that processes write operations and synchronizes data across replica nodes.

The controller node 612 includes an API 618, a cluster egress controller 620, and a CoreDNS 622 component that provides data to the Internet 616 (e.g., route 53, DNS, etc.). The API 618, such as a Kubernetes API, defines a set of operations and resources that allow users and internal components to communicate and manage the state of the cluster. The API 618 is used for tasks such as creating, updating, and deleting resources, querying the state of resources, watching for changes to resources, controlling access to clusters, integrating with external systems, and the like. This includes managing all objects like pods, services, deployments, containers, and more. Through the API 618, the user can enforce access control and permissions to ensure that users and services have the appropriate level of access. The API 618 includes a monitoring component (not shown) to watch pods, nodes, containers, maps, or the like and forward monitored information to the cluster egress controller 620.

The cluster egress controller 620 is a per-cluster service running on the control plane node and acts as a proxy for pod configmaps since the node egress daemon 628, such as the worker node egress controller 506, should only be allowed access to configmaps for pods on its node. The cluster egress controller 620 has access to all configmaps in all namespaces and monitors pod scheduling events on nodes in the cluster. For example, when a pod lands on a node, it will send the corresponding configmap to the node egress daemon 628 on that node, such as on worker node 610.

The CoreDNS 622 component is a flexible, extensible DNS server that can serve as the service discovery backend for different environments, providing name resolution for services, containers, and/or pods within a cluster. It translates human-readable hostnames (e.g., service.namespace.svc.cluster.local) into the IP addresses of the services or pods they represent, thereby facilitating communication within the cluster. In some examples, a customer container will have access, for example via the controller node 612, to the CoreDNS 622 component (e.g., service), allowing it to resolve cluster local names as well as a limited set of trusted domains (e.g., domains associated with the cloud data platform).

Returning to the customer cluster 608, the worker node 610 includes a node agent 638, a customer pod 624 including customer container(s) 626, a CNI 640, a node egress daemon 628, and a worker eBPF 630.

The worker node 610 is a machine (e.g., physical, virtual, combination), in a cluster that runs applications and workloads as containers, where the worker node 610 is responsible for executing tasks assigned to it by a control plane. The worker node 610 is a node that runs the application containers and is managed by the control plane. The worker node 610 runs an agent, such as node agent 638, to communicate with the control plane. The node agent 638 ensures that the containers are running in a specified location. In some examples, the worker node 610 (or nodes) may run other agents for monitoring, logging, security, and the like. In some examples using Kubernetes, for example, worker nodes are where the actual computation and execution of applications occurs, while the control plane nodes are responsible for orchestrating and managing the state of the cluster. The node agent 638 receives information from the API 618 in the controller node 612 and forwards some or all of that information to a CNI 640.

The CNI 640 is a combination of a generic CNI used for managing service-to-service communication, and a custom cloud data platform CNI for secure egress. In the customer pod 624, the secure egress CNI will create a second veth alongside the one created by the generic CNI, configure all Internet-bound traffic through it, and install an eBPF program on it via a worker eBPF 630. This eBPF program, via the worker eBPF 630, will forward all egress packets to the fleet of egress proxies, such as proxy eBPF 634 (described in detail below). On the customer pod 624 startup, it communicates with the node egress daemon 628 to perform IP Address Management (IPAM) and to initialize its eBPF with egress policies so that the pod has Internet access immediately.

In some examples, when all nodes in a cluster run the same CNI, all nodes must have the cluster egress controller 620 (such as the cluster egress controller 504) running, including control plane nodes, so that the CNI binary is copied and executed correctly. The controller consists of two components, an agent and an eBPF component, such as worker eBPF 630. The agent includes a userspace agent that contains logic for performing IP Address Management (described in more detail below related to CNI) and installing/managing eBPF code. The agent also acts as a Google Remote Procedure Call (gRPC) server for certain APIs. The worker eBPF 630 (e.g., eBPF component) includes eBPF code that is installed on a specific veth and will perform Source Network Address Translation (SNAT) (e.g., pod IP to node IP) on the outgoing packet. The worker eBPF 630 enforces any egress policies on the traffic and encapsulates the packet in a header, such as a GENEVE header, and forwards it to the correct egress proxy.

In some example embodiments, SNAT is a technique used in network routing and firewall configurations to modify the source IP address of packets as they pass through a router or firewall. The primary purpose of SNAT is to allow multiple devices on a private network to access external networks, such as the internet, using a single public IP address. When a device within a private network initiates a connection to an external network, the router or firewall replaces the private source IP address in the outgoing packets with its own public IP address. In some embodiments, the egress proxies have a private IP address. The egress proxies can run in a cluster that is behind a NAT gateway, which has the public IP address. In other words, the egress proxies act as a NAT gateway for the container service, and then the NAT gateway in the applications cluster they are running in performs the final NAT to a public IP address.

This translation process ensures that all responses from the external network are directed back to the router or firewall, which then translates the public IP address back to the original private IP address and forwards the responses to the appropriate device within the private network. SNAT is particularly useful in situations where there is a limited number of public IP addresses available, as it allows multiple devices to share a single public IP address. It also adds a layer of security by hiding the internal IP addresses of devices on the private network from the external network. In the context of Kubernetes, SNAT might be used when configuring egress traffic from pods to external services, ensuring that the pods can communicate with the outside world while maintaining the integrity of the internal network structure.

The CNI 640 can be a custom container network interface plugin. Initially, a container/pod has no network interface. During container/pod initialization, the container runtime invokes a CNI plugin with verbs such as ADD, DEL, and CHECK, which will create, delete, and audit the container's network devices, respectively. In some examples, a pod or container will have a single CNI plugin that handles network initialization for the entire entity, such as Cilium's CNI plugin; however, the CNI specification also supports chaining multiple CNIs together. Calico does this by chaining its CNI plugin with the reference CNI plugin port map. This design involves chaining a second, custom CNI plugin, such as a component of the cloud data platform 102, after the unmodified CNI plugin that is used for inter-service communication (e.g., Calico or Cilium). With this chaining, the specific verb (e.g., ADD) is called on each plugin sequentially, passing the result of the preceding plugin to the subsequent one as a JSON parameter. Thus, if the unmodified CNI plugin is first in the chain, then it will not see any previous results and will conclude that it is running unchained, proceeding as it normally would. The custom CNI plugin would then add any additional network devices or routes that are necessary and pass through the result from the original plugin.

The CNI plugin is responsible for (e.g., configured to) on pod creation and on pod destruction. On pod creation includes creating and configuring, including IP Address Management (IPAM), the veth pair in the customer pod. It configures routes in the pod's network namespace to route internal and/or external traffic through the correct veth. On pod destruction includes unregistering all policies and releasing the proxy list resources from the egress controller.

As noted above, the container runtime invokes a CNI plugin with verbs such as ADD, DEL, and CHECK, although others may similarly apply. For example, the custom CNI performs operations for ADD according to an example CNI interface procedure. First, the procedure creates a veth pair and moves the sandbox end into the sandbox network namespace. In some examples, the host veth device's name can be unique across the node, but the sandbox veth can be the same in each pod. Second, the procedure, via the custom CNI, initializes the veth devices. This initialization may include allocating and assigning IP addresses to the sandbox and host veth devices. For example, it may perform a call of the AllocateIPPair( ) CTL API to get a pair of IP addresses that are unique across the host but not across multiple hosts; it then assigns the allocated IP addresses to the sandbox and host veth devices. The initialization of the veth devices includes a call of the InstallEBPF( ) CTL API to initialize the host veth device with the policy enforcement eBPF program. In some examples, this can be performed before bringing up the veth devices to ensure policy enforcement exists before traffic can traverse the path. Last, in the initialization of the veth device, the custom CNI starts the devices by transitioning their state to UP. Third, the procedure, via the custom CNI, configures routes in the sandbox so that all traffic to public endpoints route through the newly created veth and all traffic to private endpoints route through eth0. This configuration can include removing any existing routes in the sandbox to avoid unexpected behavior and setting default routes through the newly created sandbox veth. For example, this can include routing packets with a destination IP that is private (e.g., 10.0.0.0/8, 172.16.0.0/12, and 192.168.0.0/16) through eth0.

In another example of the container runtime invoking a CNI plugin with verbs, a CHECK operation can be performed by confirming that the veth pair created during the ADD operation (e.g., step) is in the UP state. A DEL operation can be performed, where the CNI plugins are invoked in the reverse order from the ADD operation, where the custom CNI plugin can run first before the inter-service CNI plugin. For example, the DEL operation can include deleting the veth pair created during the ADD step, then it unregisters all policies associated with the pod, and deletes the proxy list.

Returning back to the worker node 610, the node egress daemon 628 is a per-node daemon or agent and has two primary responsibilities: (1) manage the per-pod and per-node eBPF used for secure egress and (2) proxy DNS requests from the customer pods 624. The node egress daemon 628 will receive configmaps for pods on its node from the cluster egress controller 620. These configmaps contain a list of egress proxies to use and a compute service manager-signed egress policy specifying a list of allowed endpoints the pod can access, which it programs into the pod's eBPF and registers with the proxies. According to some example embodiments, an egress policy can contain a list of rules, where each rule defines an allowed endpoint. An endpoint may include multiple allowed IP addresses with a list of allowed ports. For example, the node egress daemon 628 can register a policy with the worker eBPF 630. In some examples, the node egress daemon 628 can also handle DNS requests from customer containers. For example, the node egress daemon 628 handles a DNS request from the customer container(s) 626 and DNS requests to the CoreDNS 622 (described in more detail below with reference to control flow 604 and data flow 606).

Returning to the block diagram 600, the worker node 610, or components thereof, forward (e.g., provide) information from the customer cluster 608 to the egress proxy 614. The egress proxy 614 is a shared resource that has two primary responsibilities: (1) using eBPF, it performs policy enforcement on all packets leaving the cloud data platform container services VPC and (2) it acts as a NAT internet gateway. In some examples, the egress proxy 614 runs in an applications cluster, which is shared by other tenants in the cloud data platform. The node egress daemon 628 will register the compute service manager-signed egress policy from each pod's configmap with the egress proxy 614 via an egress agent 632. The egress agent 632 can provide information to the proxy eBPF 634, such as the eBPF map including the node IP, service identifier, or other egress information.

As noted above in reference to the node egress daemon 628, the node egress daemon 628 can handle DNS requests from customer containers, which provides for mechanisms to perform traffic flows (as illustrated in FIG. 6 via arrows). In the illustrated example, a key 602 provides for solid arrows denoting a control flow 604 (e.g., control path) and dotted arrows denoting a data flow 606 (e.g., data path) amongst and between corresponding components of the network egress access control architecture. Specifically, the example system architecture illustrated in block diagram 600 shows a control flow 604 and a data flow 606 between a compute service manager 108, a customer cluster 608, a worker node 610, a controller node 612, an egress proxy 614, and the Internet destination 636. Traffic flows include routing a packet to the Internet or an intra-cluster pod (described and depicted in connection with FIG. 9), creating and propagating an egress policy, handling a DNS request from the customer pod, and managing and selecting egress proxies.

In some examples of DNS flow within the block diagram 600, when a customer container 626 issues a DNS request, the packet will be routed through the secure egress virtual Ethernet (veth), which forwards it to the node egress daemon 628 via eBPF. The node egress daemon 628 then does one of the following for the hostname being resolved: (1) if the hostname is in the egress policy, then it returns a pre-resolved IP specified in the policy, (2) if the customer pod 624 has an allow-all policy, then it forwards the request to CoreDNS 622, or (3) it returns nxdomain (Non-Existent Domain), the DNS response code indicating that the domain name queried does not exist in the DNS records (e.g., failure to resolve). In some embodiments, the customer pod 624 is forwarded to coreDNS 622 when the hostname is cluster local (e.g., refers to an internal service of the cloud data platform This flow only applies to customer pods. System pods are considered trusted and will just use a CNI for policy enforcement. According to example embodiments, a secure egress veth can be used in conjunction with network policies and eBPF programs to enforce security controls on the traffic leaving the customer container(s) 626. For example, example embodiments ensure that only authorized connections are allowed to external services (e.g., Internet destination 636), redirect traffic through an egress proxy 614 for inspection or filtering, logging/monitoring egress attempts, and the like.

Example embodiments of block diagram 600 further illustrate packet flow through the system. If a packet is Internet-bound (e.g., Internet destination 636), then the packet will be routed through the secure egress veth, which, using eBPF, forwards it to a per-node GENEVE device. This GENEVE device has an eBPF program that encapsulates the packet in a GENEVE header (e.g., UDP packet), adds some identifying information, and sends this packet to the egress proxy 614. The egress proxy 614 decapsulates the packet to get the original header and performs policy validation using the destination IP address and the identifying information in the header. If the packet is allowed, then the proxy changes the source IP address to its own and sends the packet to the Internet destination 636. If it is not allowed, then the packet is dropped. The return packet follows a reverse flow back to the customer pod 624. In some examples, the container services virtual private cloud (VPC) is configured to route all egress traffic through the egress proxy 614, which will drop all un-encapsulated traffic. Service-to-service traffic, implied by a private IP destination in the packet, will use a CNI for policy enforcement and does not go through the flow described above.

Example embodiments of block diagram 600 further illustrate policy propagation flow through the system. For example, during service creation, a configmap is generated that includes a list of egress proxies for that service to use and a compute service manager-signed JSON Web Token (JWT) containing the list of allowed endpoints. When a pod from the service is scheduled on a node, then the cluster egress controller 620 will forward the pod's configmap to the node egress daemon 628 on the node the customer pod 624 was scheduled on. When the node egress daemon 628 receives the pod's configmap, the node egress daemon 628 will take the policies in the egress policy and register it in the worker eBPF 630 on the pod's veth and also forward it to the egress proxy 614. When receiving a policy on the egress agent 632 from the node egress daemon 628, the egress agent 632 or egress proxy 614 will validate that the JWT is signed by the compute service manager or component thereof, and, if so, then it will program its eBPF with the policies for that pod.

In addition, eBPF is a powerful kernel feature that can do more than just packet processing. For example, some other useful features of eBPF include system call tracing and security enforcement via Linux Security Modules (LSM) BPF that can unify all these use cases and leverage a single agent process that handles all eBPF related operations. The eBPF agent can additionally be used for malicious activity monitoring. The platform agent 109 can be the eBPF agent in the worker node 610, and the agent binary can be granted the capabilities. The platform agent 109 is further configured to set up network devices for external access so that all the networking setup is handled by a single executable. To enable external network access from a sandbox process in the worker node 610, customized packet redirection and policy enforcement logic is implemented in eBPF program code. This eBPF code is compiled into binary files and attached to the ingress/egress side of different network interfaces so that each packet incoming to or outgoing from those network interfaces can be validated by the eBPF code. The cloud data platform or component thereof ensures that packets routed through the egress proxy (e.g., proxy service 115) and that the destination IP address is allowed as per the egress policies defined by the customer. This includes the population of several BPF maps with information about allowed destinations.

In some examples, the compute service manager 108 can extract the egress policy from a token, such as a JWT string and populate the BPF maps, such as a policy map and a query information map. The policy map can include information such as the sandbox identifier, destination IP address, destination port, and the like. The query information map can include information such as the sandbox IP address, the query identifier, the sandbox identifier, and the like.

For purposes of this disclosure, a virtual private cloud (VPC) can comprise (or refer to) a private cloud that includes private, dedicated, and isolated network environment(s) within a public cloud, enabling the organization to leverage the benefits of cloud computing (e.g., flexibility and scalability) while maintaining a higher level of security and control over the network resources, such as VPCs, virtual private networks (VPNs), load balancers, and the like. A VPC can include an on-demand configurable pool of shared computing resources allocated within a public cloud environment, providing a certain level of isolation between different organizations (e.g., different users) using the resources. A cloud data platform for data storing, data warehousing, data sharing, data lakes, consumption of real-time data, or the like can implement or configure a VPC, such as a virtualized environment that is configured on dedicated hardware instances, which can be physically isolated from other customers. For example, the cloud data platform can be a network-based data platform, network-based data system, cloud data platform, virtual private cloud data platform, virtual private data platform, or the like.

Figure 7:
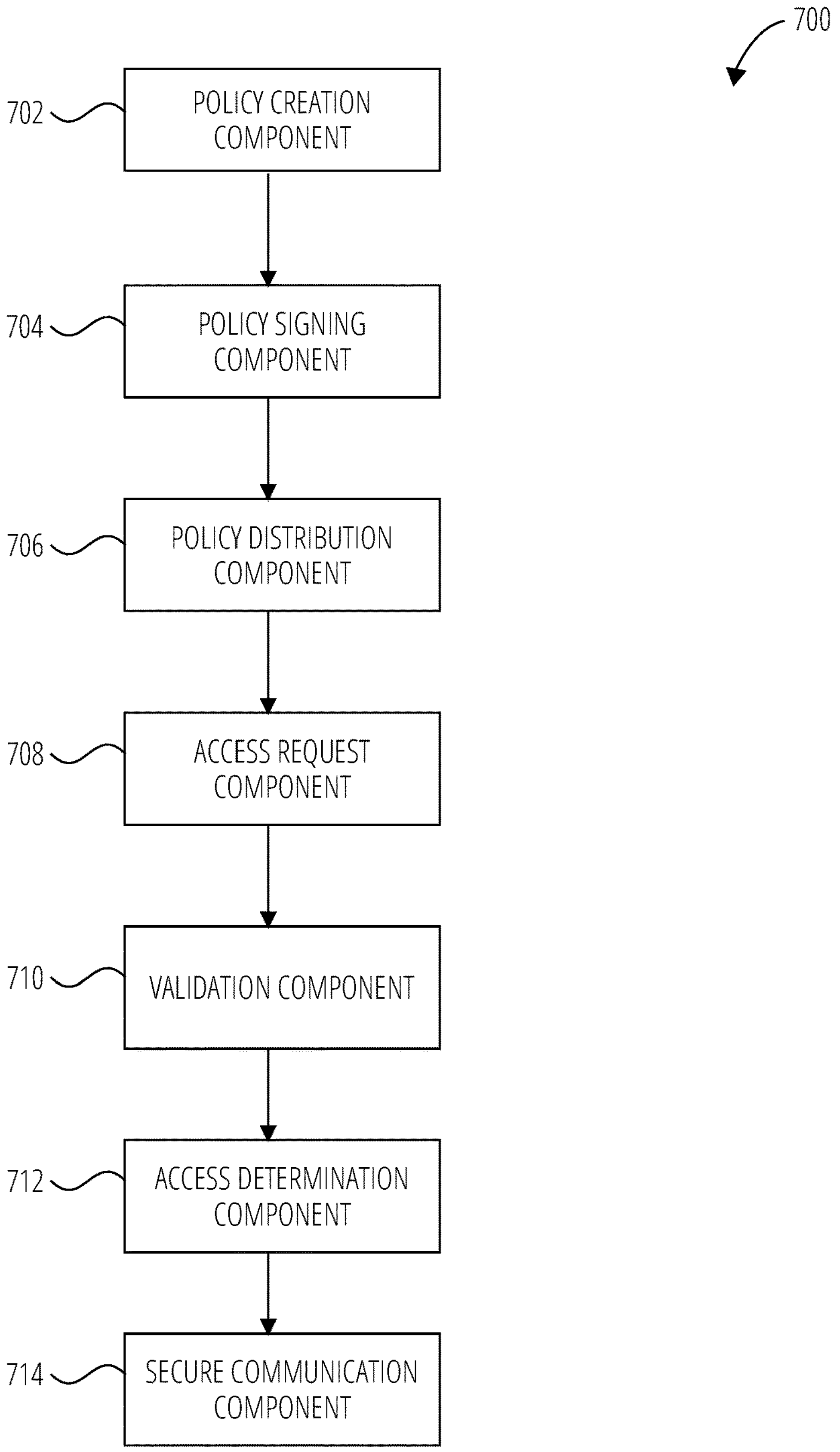
FIG. 7 illustrates an example control flow of information in a container requesting access to an external resource, according to some example embodiments.

FIG. 7 shows a flow diagram 700 illustrating an example of control flow of information in a container requesting access to an external resource, according to some example embodiments. Example embodiments of the control flow include similar elements and components as depicted and described in connection with FIGS. 5 and 6. To avoid obscuring the inventive subject matter with unnecessary detail, various functional components that are redundant to those described and depicted in connection with FIGS. 5 and 6 have been omitted from FIG. 7. However, a skilled artisan will readily recognize that various additional functional components may be included as part of the flow diagram 700 to facilitate additional functionality that is not specifically described herein.

According to example embodiments, the container asks for permission to talk to an external service, and the system, such as the network egress access control system 510, quickly checks a secure token to see if it is allowed. Assuming all access checks out, the container gets permission to communicate with the service. The example flow diagram 700 includes a multitude of steps, for example and not limitation, seven steps including: policy creation, signing policies, policy distribution, request for access, immediate validation, access granted or denied, and secure communication. In some examples, one or more steps may be skipped, repeated, or modified according to the present disclosure.

A policy creation component 702 is a trusted component of the network egress access control system 510, like the service controller 502, which creates a set of rules that define which external services a container is allowed to access. The policy signing component 704 handles signing policies, where these rules are then cryptographically signed, creating a secure token that represents the egress policy. The policy distribution component 706 handles the signed token, which is distributed to the relevant parts of the system, such as the egress proxy, which will enforce the rules. There are three types of policies: a DNS policy, an IP policy, and a pinned IP policy, all three of which are signed by either the compute service manager 108 or a policy pinner.

A policy pinner is a component within a secure network infrastructure that is responsible for "pinning" network policies to specific nodes or worker instances. Pinning in this sense means associating or binding a network policy with a particular node to ensure that the policy cannot be applied or used by any other node. The policy pinner is a security mechanism that ties network policies to specific nodes to prevent unauthorized use of network permissions, which is a critical aspect of maintaining a secure and controlled network environment in distributed systems. An example of a policy pinner operates by generating policies, associating nodes, distributing policies, enforcing security, and validating policies. The policy pinner receives network policies, which are typically in the form of signed tokens or certificates that contain rules about what network traffic is allowed for a particular service or container. The policy pinner then associates these policies with a specific node's IP address, creating a "pinned" policy. This ensures that the policy is only valid when used in the context of the designated node. The pinned policies are distributed to the relevant components, such as an egress proxy or a node egress daemon, which enforce the network policies based on the traffic originating from the associated node. By pinning policies to specific nodes, the system prevents the possibility of a compromised or malicious node from using another node's network policies to bypass security controls. This is particularly important in environments where some nodes are considered untrusted. When a node attempts to apply a network policy to its traffic, the egress proxy or other enforcing component checks the pinned policy to ensure that it originates from the correct node. If the policy does not match the node's IP address, the traffic is denied, maintaining the integrity of the network security model. The policy pinner can be a component of the network egress access control system 510, such as a component in the cluster egress controller 504 or other controller nodes.

Examples of the DNS policy and the IP policy are provisioned and signed by the compute service manager 108 and are passed in via an egress configmap that is mounted into the customer pod 624. The pinned IP policy, which are IP policies that are 'pinned' to a specific node IP to prevent horizontal sharing of policies, is only accepted by an egress proxy. An egress sidecar (described and depicted in connection with FIG. 8A) converts DNS policies and IP policies (e.g., base policies) into pinned policies (e.g., derived policies), and this conversion is denoted herein as 'pinning' a policy. According to some examples, there are four scenarios where the egress sidecar will register policies: (1) the customer pod starts up and has pre-configured IP policies in the egress configmap, (2) new policies are added to the egress configmap at runtime (via the external access integration), (3) the customer resolves a valid hostname, and (4) a previously pinned policy is about to expire. The first two scenarios are described and depicted in more detail in connection with FIG. 8A.

Returning to flow diagram 700, the access request component 708 requests access, where a container within the system wants to send data to an external service, so it sends an egress request. For example, a customer pod cannot access any of its allowed IP addresses until its corresponding pinned IP policies are registered with the egress proxy. The validation component 710 handles immediate validation, where the egress proxy receives the request and uses the signed token to immediately validate whether the request complies with the established rules. The access determination component 712 grants or denies access. If the request is validated successfully, the egress proxy allows the traffic to pass through to the external service. If the request does not comply with the rules, it is denied, and the container cannot access the external resource. The secure communication component 714 handles secure communication, where throughout this process, the use of cryptographic signatures ensures that the egress policies have not been altered, maintaining the security of the communication.

Figure 8A:
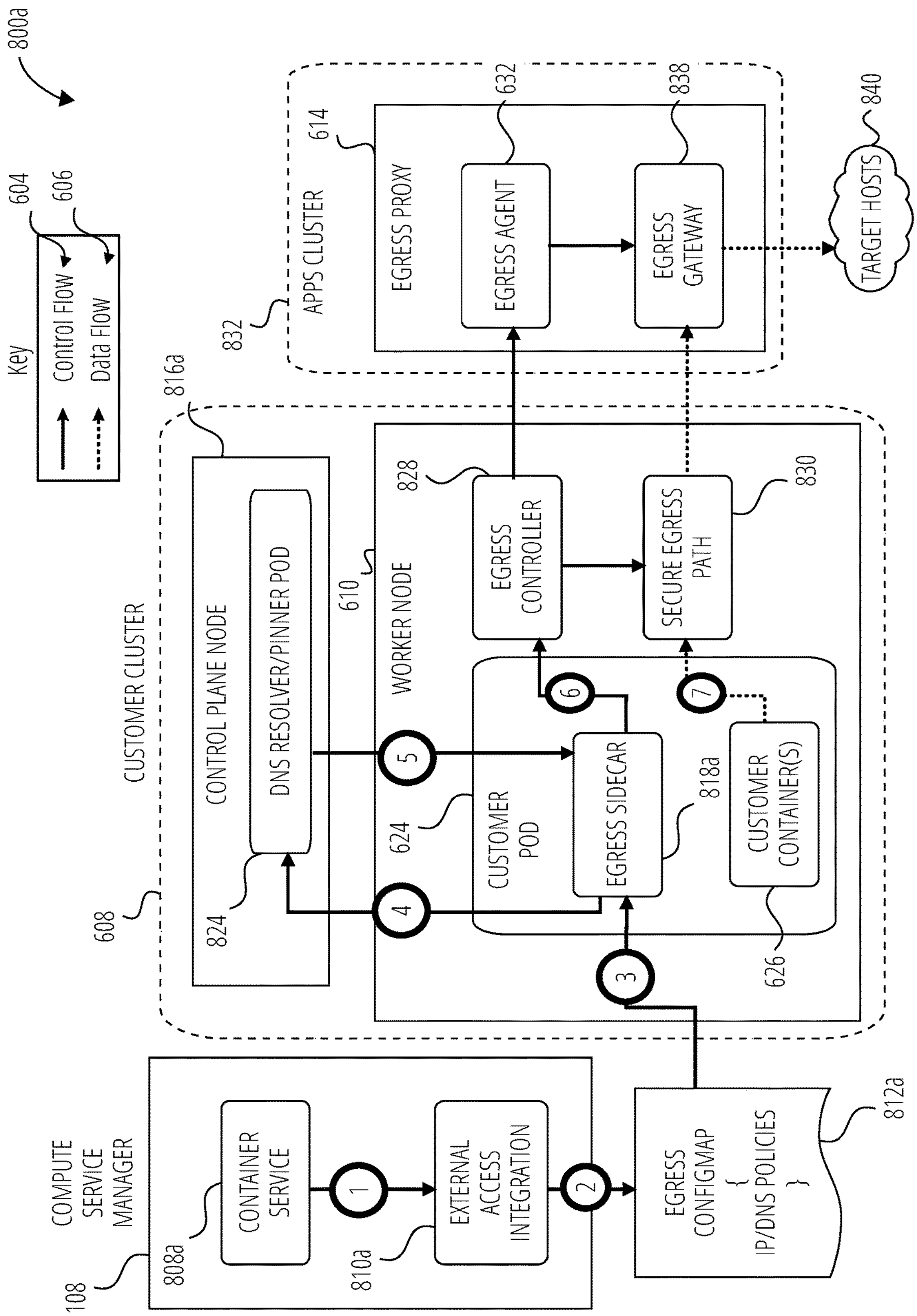
FIG. 8A is a flow diagram of an egress sidecar to register policies and control traffic flow through the network egress access control system, according to some example embodiments.

FIG. 8A illustrates a flow diagram 800*a* where an egress sidecar will register policies and illustrates control flow and data flow through the network egress access control system, according to an example embodiment. The flow diagram 800*a* shows similar subsystems as in FIG. 5 and a similar system architecture as described and depicted in connection with FIG. 6, including a high-level flow of traffic through the network egress access control system during policy registration and pinning. To avoid obscuring the inventive subject matter with unnecessary detail, various functional components that are redundant to those described and depicted in connection with FIGS. 5-7 have been omitted from FIG. 8A. However, a skilled artisan will readily recognize that various additional functional components may be included as part of the flow diagram 800*a* to facilitate additional functionality that is not specifically described herein.

The flow diagram 800*a* depicts the flow for two scenarios, for exemplary purposes, where the egress sidecar 818*a* will register policies; specifically, scenarios where the customer pod starts up and has pre-configured IP policies in the egress configmap, and where new policies are added to the egress configmap at runtime (via the external access integration). In the flow diagram 800*a*, a key provides for solid arrows denoting a control flow 604 (e.g., control path) and dotted arrows denoting a data flow 606 (e.g., data path) amongst and between corresponding components of the architecture. Specifically, the example flow diagram 800*a* illustrates a control flow 604 (e.g., circled numbers 1-6) and a data flow 606 (e.g., circled number 7) between a compute service manager 108, a customer cluster 608, an applications cluster 832, and target hosts 840.

At step 1, a container service 808*a* component of the compute service manager 108 creates an external access integration (EAI). For example, a customer creates a container service 808*a* associated with the cloud data platform and specifies an EAI. The customer specified EAI specifies the allowed IP address and Port pairs and DNS hostnames that the network egress access control service is allowed to use.

At step 2, an external access integration 810*a* component of the compute service manager 108 converts the EAI into an egress policy configmap 812*a*. For example, the compute service manager 108 can convert the customer specified EAI into an egress policy configmap YAML file (e.g., text file, etc.) by creating signed IP and DNS policies, creating the configmap, and populating the configmap with the newly created policies. Below is one example that defines an external access integration (EAI) based API that wants to access maps.googleapis.com (e.g., external access), where the external access includes an untrusted intermediary, and the syntax is just one possible example of applicable code:

```
::::::CODE::::::
CREATE OR REPLACE NETWORK RULE
  google_apis_network_rule
  MODE=EGRESS
  TYPE=HOST_PORT
```

```
VALUE_LIST=('translation.googleapis.com');
CREATE OR REPLACE EXTERNAL ACCESS INTEGRATION
google_apis_access_integration
  ALLOWED_NETWORK_RULES=(google_apis_network_rule)
    ALLOWED_AUTHENTICATION_SECRETS=
      (oauth_token)
  ENABLED=true;
::::::CODE::::::
```

According to the above example code, a service specification will then reference the external access integration by name. In some examples, the configmap can be replaced by an egress policy custom resource definition (CRD) that contains the signed egress policy per service (e.g., definition+signature block) and an egress proxy CRD that contains available egress proxy endpoints (e.g., AZ address, IP address) in a global or per namespace resource. In some examples, the system converts the EAI into a configmap or generate a JSON Web Token (JWT) and insert the entire token in a configmap. For example, using the EAI to generate a JWT and signing with a digital signature and populating a configmap with JWT for network egress control.

At step 3, the egress sidecar 818*a* in a worker node 610 receives the egress configmap 812*a* and applies the egress policy configmap. For example, the compute service manager 108 can apply the YAML file, which pushes the egress configmap 812*a* to the customer pod 624. The egress configmap 812*a* is accessible by the egress sidecar 818*a* of the customer pod 624, for example, via a volume mount in the pod, which allows it to read the egress configmap 812*a* as if it were a file.

At step 4, the egress sidecar 818*a* attempts to convert the IP policies in the egress configmap 812*a* into 'pinned' IP policies by forwarding the IP policies to a DNS resolver/pinner pod 824 running in a control plane node 816*a*. For example, the pinner exposes a gRPC endpoint to perform this action.

At step 5, the DNS resolver/pinner pod 824 will validate that the requesting customer pod 624 indeed owns these policies and that the policies are not revoked or expired; this creates a signed, pinned IP policy. Once validated, the DNS resolver/pinner pod 824 will create a new pinned IP policy representing the allowed IP endpoints. The DNS resolver/pinner pod 824 then responds back to the egress sidecar 818*a*.

At step 6, the egress sidecar 818*a* communicates with an egress controller 828, for example via a Unix Domain Socket, and forwards the pinned IP policies to the egress controller 828. The egress controller 828 registers the pinned IP policies on the egress proxy 614, such as to the egress agent 632. The egress agent 632 forwards the registered, pinned IP policies to an egress gateway 838 in order for the external traffic to ultimately reach target hosts 840.

At step 7, now that the IP policies are registered, the customer pod 624 in the worker node 610 (e.g., the untrusted intermediary between the compute service manager 108 and the target hosts 840) can now access the pre-configured IP addresses successfully (e.g., Internet egress is allowed and traffic flows to the target hosts 840). For example, the customer container(s) 626 pass data (e.g., data flow 606) to a secure egress path 830 of the worker node 610, which further passes the data to the egress gateway 838 of the egress proxy 614. In some examples, other policy registering and pinning scenarios (e.g., scenarios 2 and 3 above) can create additional policies during the customer pod's runtime that must be added to its egress allow-list.

As prior existing egress techniques only support a single policy per sandbox, in an example embodiment, the egress sidecar 818*a* creates a new, omnibus policy containing all of the existing policies plus the new egress allow-list amendment and overwrites the existing policy on the egress proxy. In another example embodiment, the proxies (e.g., egress proxy 614) support the allow-list amendments to the proxy's policy lists, allowing a pod to add a new entry to the policy allow-list without having to remove or overwrite the old policy version.

In some example embodiments, depending on the policy TTL, a previously pinned policy that is about to expire (e.g., scenario 4) can include a refreshing process to ensure the policy is still valid. As services pods can be long running, they will often exceed the length of the policy TTL (e.g., a few minutes). To ensure that a pod still has access to previously registered and still valid policies beyond the TTL, the egress sidecar 818*a* will periodically 're-pin' and re-register the policies again, or multiple times. For example, the egress sidecar 818*a* will pass all of the currently registered policies (e.g., pinned IP policies) to a pinner service, such as the DNS resolver/pinner pod 824. The pinner will then validate that these policies are still valid by confirming the base policy that it was derived from (e.g., the DNS policy or IP policy that originally allowed the derived pinned policy) is still present in the pod's configmap or cached versions of the configmap. The pinner will then create a new policy matching the original policy, except with an updated TTL, consolidate them all into a single policy, and return the new policy back to the egress sidecar 818*a*. The egress sidecar 818*a* then registers this new policy with the egress proxy 614, which will update the TTL for the still valid policies. Any policies that were revoked since the previous registration will then expire and be cleaned up by the egress proxy (e.g., unregister, deleted, etc.).

Further example embodiments provide for three example scenarios where a policy maybe unregistered: (1) a pod using the policy is destroyed (e.g., DEL verb of the CNI plugin called), (2) the egress policy configmap revokes the policy, and (3) the policy's TTL expires. The first two example scenarios provide optimization to the network egress access control system because these two scenarios are driven by the egress sidecar 818*a* running in the customer pod 624, which is the untrusted intermediary (e.g., worker node 610). The third example scenario (e.g., policy expiration) is the primary mechanism for un-registration in the case the worker node is compromised. Unlike prior egress techniques, the customer pod 624 according to examples herein, does not have a unique identifier with respect to policy enforcement; multiple pods can share the same policy enforcement identifier (e.g., service ID and account ID). Thus, explicitly unregistering a policy does not necessarily remove it from the egress proxy if it is in use by more than one pod. This is important to prevent one malicious pod (e.g., untrusted intermediary) from revoking Internet access from other, valid pods. When a pod issues an unregister request for a policy, the egress proxy will remove that pod from a tracking list maintained by the egress proxy (e.g., if the tracking list is empty then no pods are still referencing the policy and the policy can be safely unregistered (removed)). In some examples, a policy is considered referenced if all of the following conditions are true: (1) a pod has previously registered the policy, (2) the policy has not yet expired, and (3) the pod has not explicitly unregistered the policy. In other examples, different conditions can be determined or used to identify a referenced policy.

In example embodiments, the egress sidecar 818*a*, or other sidecar container, is responsible for managing the egress path during the runtime of the customer container. The egress sidecar 818*a* is a single binary, but is logically both a DNS proxy, forwarding DNS requests from the customer container to the DNS resolver service, and an egress controller client. The egress sidecar 818*a* is handles egress configmap updates at runtime, forwarding DNS requests from the customer container to the DNS resolver service and forward the DNS resolver's response back to the customer container, register any newly created policies from the DNS request before sending the response back to the customer container, refresh previously pinned policies about to expire, and the like.

According to some example embodiments, the functionalities performed by the egress sidecar 818*a* can be performed by an egress controller, as well as moving the DNS proxy to the egress controller as well. For example, the egress controller monitors for pod egress configmap changes (instead of the sidecar) by watching for file changes. DNS traffic (both UDP and TCP) can be redirected to egress controller using a link-local IP (instead of a localhost) for the name server and DNS queries for this link-local IP are handled by the egress controller's DNS service. The eBPF program can be modified on the egress veth to forward the link-local traffic to the host. Additional functionalities can be ported to the egress controller. DNS traffic is routed to a node local DNS resolver (which is a part of egress controller). The egress controller interacts with the pinner to generate an updated pinned policy and applies them before returning the DNS answer. The DNS resolver identifies the originating pod via the source IP address of the pod. For example, a control flow for establishing new or updated routes by the egress controller can include: (1) the compute service manager 108 creating an egress policy and pod, (2) a pinner notified of the pod/egress policy creation and generates pinned token, (3) the token is pushed to the egress controller by receiving the pinned token from the pinner, creating eBPF rules, and configuring an egress agent, (4) the pinner updates policy status section about the pushed token (optional), and (5) network plugin calls or polls egress controller for progress information and returns to the agent once the eBPF rules have been established.

According to example embodiments, services secure egress is configured to handle traffic from worker nodes with large Network Interface Cards (NICs). For example, a single customer container may be able to completely saturate a proxy instance, thus it is important to load balance between multiple proxy instances for any given customer container. Examples perform load balancing according to random proxy selection, where every TCP connection consists of a source IP, source port, destination IP, and destination port, and the ID of the pod that it originated from. On the first packet of a TCP connection, the eBPF code on the worker node will concatenate that information into a string and use it to index (e.g., by converting to an integer and modding with the map length) into the proxy list. This will be the proxy to be used for the duration of this connection. Thus, for each new TCP connection by the customer pod, a random proxy from the proxy list is selected. In some examples, load balancing is accomplished according to load-aware proxy selection, which includes random proxy selection that will spread the load from a single pod to multiple proxies, but what if a single TCP connection has an extremely high load or multiple customer pods send high traffic to a single proxy? In that case, new TCP connections avoid proxies with already high load and prefer proxies with less active load. To accomplish this, a proxy IP reconciler running in the applications cluster 832 will report both the active proxy list and also their respective loads (e.g., which will be the total network traffic). The compute service manager 108 then intelligently selects which proxies to propagate down in the egress configmap, choosing only those proxies below a certain load threshold. With this approach, proxies with high load can be avoided until their load drops back below an acceptable threshold.

Figure 8B:
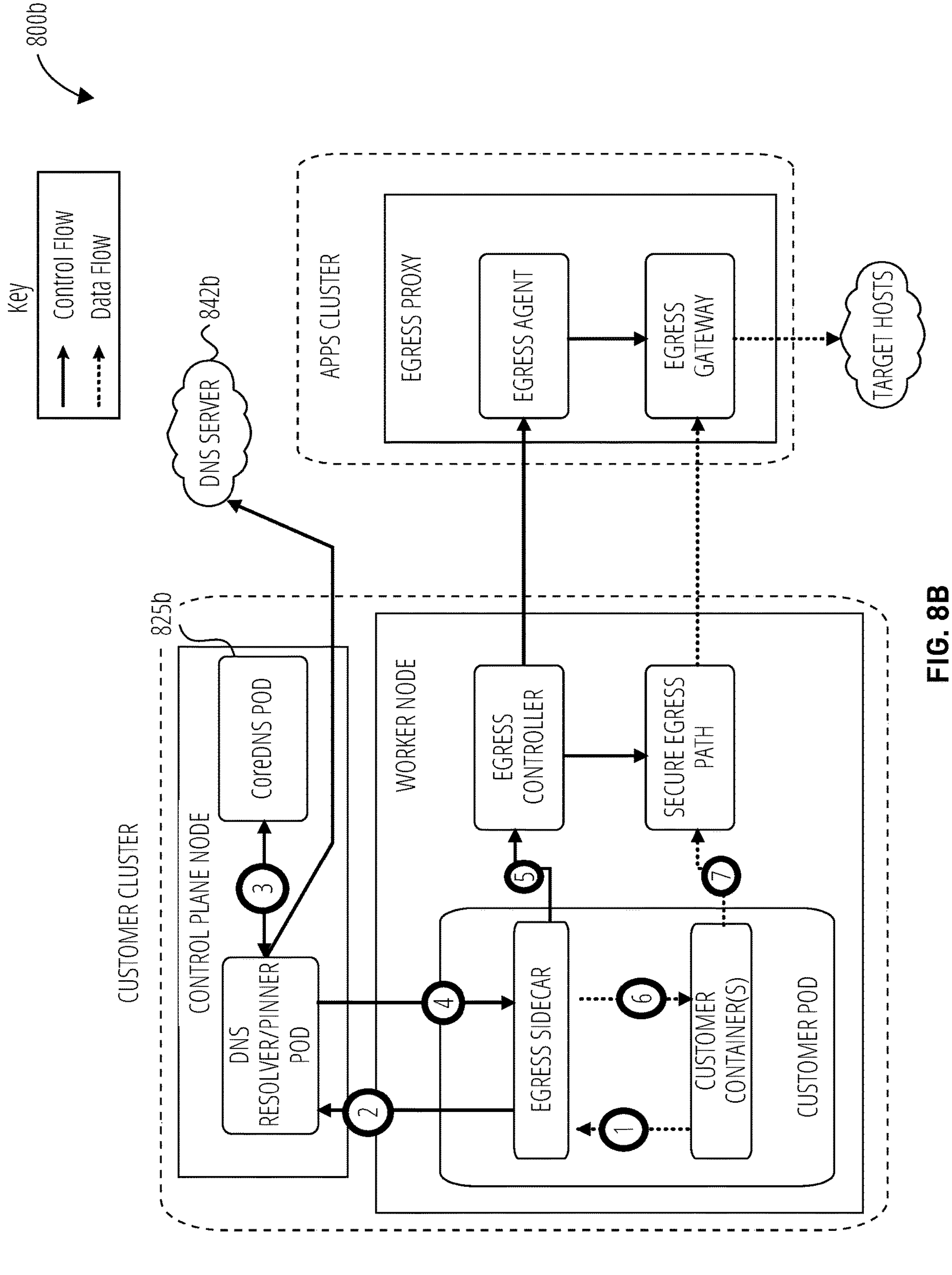
FIG. 8B is a flow diagram of a Domain Name System (DNS) request for off-node DNS resolver with policy enforcement, according to some example embodiments.

FIG. 8B illustrates a different flow diagram 800*b* when a customer pod issues a DNS request for an off-node DNS resolver with policy enforcement, according to an example embodiment. The flow diagram 800*b* shows similar architecture as that of flow diagram 800*a*. To avoid obscuring the inventive subject matter with unnecessary detail, various functional components that are redundant to those described and depicted in connection with FIG. 8A has been omitted from FIG. 8B.

In example embodiments, to avoid data exfiltration through DNS, the customer pod should not be allowed to resolve arbitrary hostnames. Instead, the customer will be able to specify a list of allowed hostnames that the pod can resolve by statically resolving hostnames in the compute service manager 108 and using an off-node DNS resolver with policy enforcement. For example, a custom DNS resolver is used to allow the pod to do DNS resolution. The customer pod can only resolve hostnames that are specifically allowed through the external access integration (as described above). These DNS requests are subject to policy enforcement performed 'off-node' because the worker node is untrusted. Thus, in some examples, a DNS resolver pod is added in the control plane of the customer's cluster, which processes DNS requests, performs policy validation, and has the ability to create signed IP policies that the egress sidecar can register with the egress proxies.

At step 1, the customer pod is configured to use a localhost (e.g., 172.0.0.1) as its DNS resolver. As the egress sidecar has the same network namespace as the customer container, it can listen on the localhost for UDP packets with a port of 53, which is the port used for DNS requests. The egress sidecar can effectively intercept DNS requests from the customer.

At step 2, the egress sidecar forwards the customer's DNS request to the DNS resolver's gRPC endpoint, which performs policy enforcement on the request and, if allowed, resolves the hostname. The DNS resolver, optionally, includes any relevant DNS policies, which are signed by the compute service manager in order to aid in policy enforcement.

At step 3, upon receipt of a DNS request, the DNS resolver validates that the specific customer pod can resolve the specified hostname. The DNS resolver performs this by using the included DNS policies, querying the DNS server 842*b*, or querying the pod's configmap to get its policy list. If the DNS request is valid, then the DNS resolver will resolve the hostname. For cluster-local hostnames, it uses the cluster's coreDNS instance 825*b*. For Internet hostnames, it uses a public DNS resolver on the host's Internet.

At step 4, once all hostnames are resolved, the DNS resolver generates either a pinned IP policy (e.g., when an AName is returned) or a new DNS Policy that is derived from the original (e.g., when a CName is returned). Prepinning the policy ensures the egress sidecar does not need to make a second request to the resolver/pinner to pin the new policy. The DNS resolver then sends any newly created policies to the egress sidecar, including a DNS response to send to the customer pod.

At step 5, if the DNS resolver responded with new pinned policies, the egress sidecar registers these policies with the egress controller. The egress controller, in turn, registers the policies on the egress proxies. Once step 5 is completed, the customer pod can access the IP addresses that were resolved.

At step 6, at this point, the DNS request was processed, creating zero or more new pinned IP policies. The egress sidecar forwards the DNS response created in the DNS resolver back to the customer pod.

At step 7, the customer pod can now successfully send packets to any IP addresses that were returned in the DNS request.

According to some example embodiments, the egress proxy 508, or other component of the network egress access control system 510, further provides for proxy management and discovery. A set of egress proxies can be dynamic. Even though individual proxies may fail, or the entire fleet may be redeployed, any changes to the set of egress proxies should be transparent to the customer pod. For example, proxy discovery refers to the process of determining the available proxies for a given customer pod and propagating the IP addresses to the egress controller on the node. The steps for the flow for proxy discovery with services secure egress include: (1) A proxy IP reconciler is deployed in the app cluster along with the egress proxies. The reconciler will periodically poll for the health of all egress proxies in the cluster and tabulate the successful answers. (2) Once the reconciler generates a list of available proxies, it writes this list to a key-value store of the compute service manager global metadata query engine. (3) A background job running in the compute service manager periodically polls the key-value store for the latest proxy IP list. In some examples, there is a lock around this proxy list, so only one compute service manager will actually successfully query the list at any given time. (4) If there is a new proxy list in the key-value store (e.g., meaning there was a proxy failure, revival, or redeployment), then the compute service manager creates an egress policy configmap with the new list. It ensures the sequence number of this new list is incremented so the changes take effect on the nodes. The configmap includes proxies in all AZs and the node is responsible for using proxies in its availability zone (AZ). (5) The new egress policy configmap is applied to the customer cluster. The egress sidecar detects this change and reads in the new proxy list. (6) If the sequence number of the list is greater than the one it has previously applied, then the egress sidecar will register the new list with the egress controller. (7) At this point, all new TCP connections from the customer container will use the newly registered list instead of the old one. The process is happening continuously, but a new proxy list is only pushed to the customer cluster when the service starts (e.g., the init container calls into the egress controller with the proxy list) or if the IP addresses of the available proxies changes (e.g., the egress sidecar calls into the egress controller).

Figure 9:
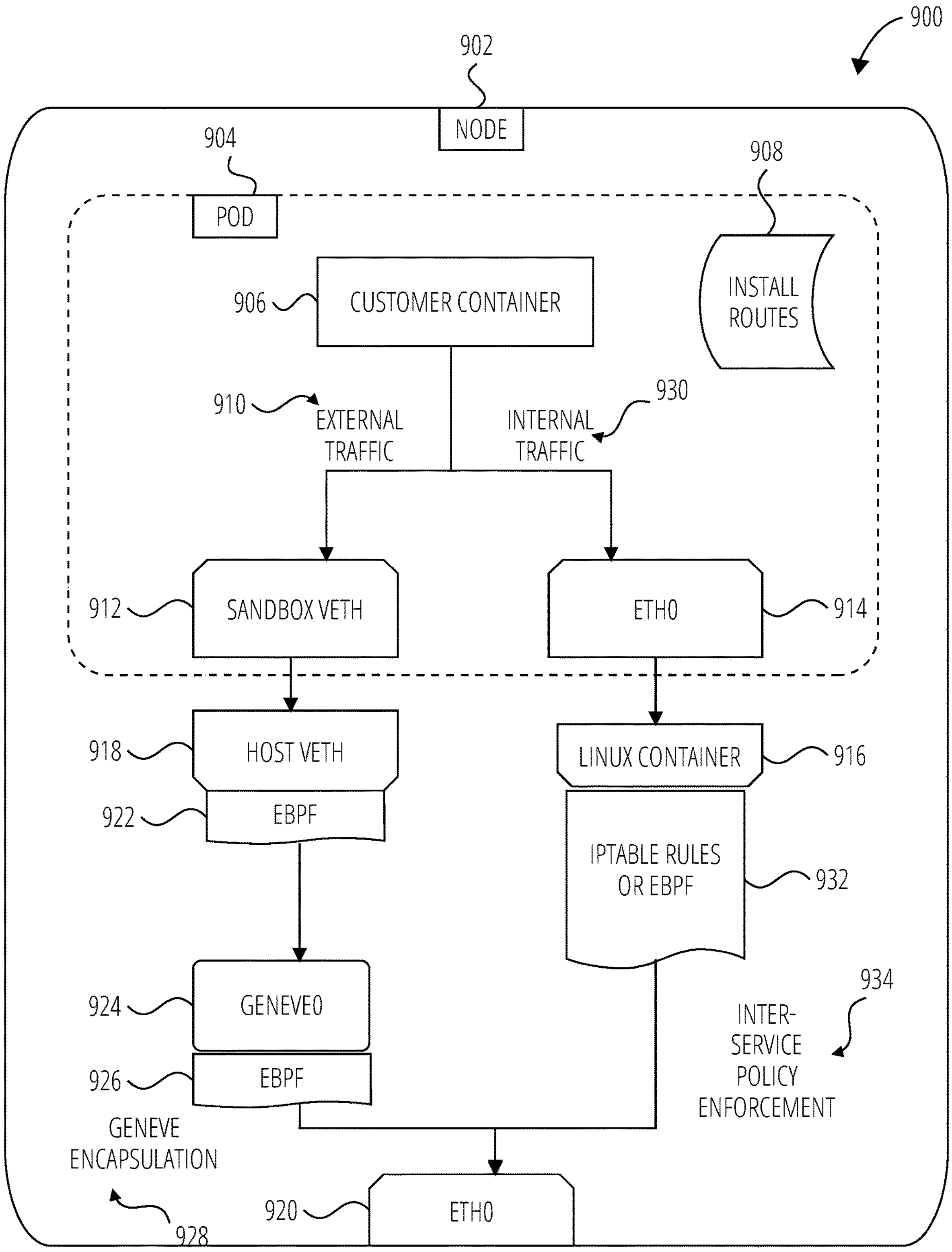
FIG. 9 is a block diagram illustrating routing Internet-bound traffic versus intra-cluster traffic, according to some example embodiments.

FIG. 9 shows a block diagram 900 illustrating an example embodiment of routing Internet-bound traffic versus intra-cluster traffic, according to some example embodiments. The block diagram 900 as described and depicted in connection with FIG. 9 shows a high-level diagram of the components involved in securing network egress access control with untrusted intermediaries (e.g., untrusted targets). To avoid obscuring the inventive subject matter with unnecessary detail, various functional components that are redundant to those described and depicted in connection with FIGS. 5-8 have been omitted from FIG. 9. However, a skilled artisan will readily recognize that various additional functional components may be included as part of the block diagram 900 to facilitate additional functionality that is not specifically described herein.

A packet originating from a customer pod 904 on node 902 is treated differently depending on whether its destination IP address is a public address or a private address. If the destination IP address is private, then a networking solution like CALICO or CILIUM is used to enforce intra-cluster network policies. If the destination IP address is public, then the cloud data platform-internal, eBPF-based egress proxy technology is used to enforce policies. A custom CNI that is chained with CALICO or CILIUM creates a second veth and installs additional routing rules in the pod 904 to send intra-cluster traffic down the internal traffic 930 veth (e.g., eth0 914) and the Internet-bound traffic down the external traffic 910 veth (e.g., sandbox veth 912) of the block diagram 900. The cloud data platform manages installation routes 908, which, for example, can default via the sandbox veth 912 for external traffic, whereas private IP addresses are sent via eth0 914.

For example, traffic originating from the customer pod 904 flows in one of two ways, via intra-cluster traffic (e.g., internal traffic 930) or via Internet-bound traffic (e.g., external traffic 910). The external traffic 910 route includes receiving traffic from a customer container 906 and sending it to sandbox veth 912 within the pod 904. Packets are routed down the Internet-bound veth (left side of FIG. 9) and the egress controller is responsible for forwarding the packet to the egress proxy for policy enforcement, which is performed, for example, using an eBPF 922 program installed on the Internet-bound host veth 918 that processes packets and drops those with a private destination IP address. Once policy enforcement is performed by the eBPF 922 program, it forwards the packet to the next hop, geneve0 924 device, to use GENEVE encapsulation 928. The eBPF 926 code at geneve0 924 can parse the header to retrieve the identifier and provide updates from an egress configmap to reach eth0 920.

Alternatively, the internal traffic 930 route includes sending the traffic to eth0 914. Packets are routed down the intra-cluster veth (e.g., eth0 914) (right side of FIG. 9) to a Linux Container 916 (LXC) that combines the kernel's C-groups and support for isolated namespaces to provide an isolated environment for applications. The Linux Container 916 reviews the IPtable rules or eBPF 932 in order to redirect the traffic to a local host and port. The CNIs are responsible for enforcing network policies and forwarding the traffic to the correct node, pod, container, or the like according to the inter-service policy enforcement 934.

If successful, both the external traffic 910 route and the internal traffic 930 route culminate at eth0 920 (e.g., a network interface device name to represent the first Ethernet network interface), the allowed destination for the packets.

The above example cannot be satisfied by allowing the sandboxed code to directly access the execution platform's network (e.g., eth0 device), and there are challenges to implement egress control directly on eth0 (e.g., a network interface device name to represent the first Ethernet network interface) without affecting other execution platform workloads. Therefore, an overlay network solution can be used in combination with the network egress access control system 510 to establish this secure egress path (the overlay network is described and depicted in detail in connection with FIG. 10).

Figure 10:
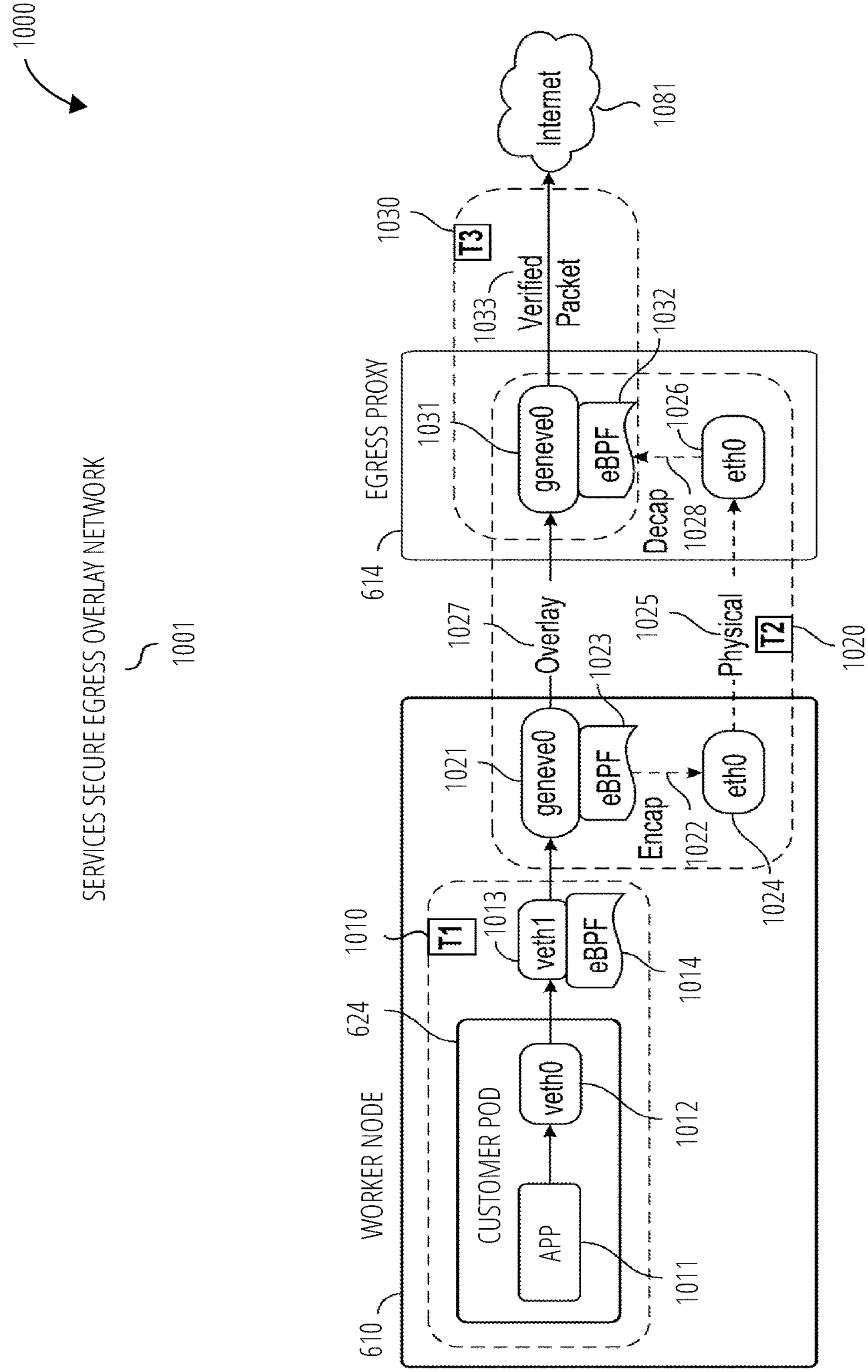
FIG. 10 is a block diagram illustrating a system architecture depicting a services secure egress overlay network, according to some example embodiments.

FIG. 10 is a block diagram illustrating a system architecture 1000 depicting a services secure egress overlay network 1001, in accordance with example embodiments. The example system architecture 1000 includes the services secure egress overlay network 1001 including the worker node 610; however, it will be understood by those of ordinary skill in the art that other components of the cloud data platform 102, such as the compute service manager 108, can be used in place of the worker node 610.

A secure egress path is established using an overlay network. Simply put, an overlay network is a virtual network of nodes and logical links, which are built on top of an existing physical or virtual network. The overlay creates a new layer where traffic can be programmatically directed through new virtual network routes or paths instead of requiring physical links. It also enables the cloud data platform or users of the cloud data platform to define and manage traffic flows, irrespective of the underlying physical infrastructure.

As noted above in connection with FIG. 5, the secure egress path for external access with untrusted intermediaries must meet strict specifications, including strict egress isolation, strict egress control, and/or egress policy enforcement. Such specifications cannot be satisfied by allowing the customer pod 624 code (e.g., application 1011) to directly access the worker node's 610 network (e.g., eth0 devices 1024/1026) without affecting other execution platform workloads. Therefore, the overlay network solution of FIG. 10 is proposed to establish this secure egress path. The overlay network solution of FIG. 10 can be used to establish a secure egress path in the network egress access control system 510 and can include the overlay network that is a virtual network of nodes and logical links built on top of an existing physical or virtual network. The overlay network 1001 creates a new layer where traffic can be programmatically directed through new virtual network routes or paths (e.g., overlay 1027) instead of requiring physical links (e.g., physical 1025). It also enables the cloud data platform 102 or components thereof to define and manage traffic flows irrespective of the underlying physical infrastructure.

FIG. 10 demonstrates the secure egress path from a customer pod 624 to an egress proxy (e.g., proxy service 115, egress proxy 614), which applies the services secure egress overlay network 1001 to achieve egress control and isolation when dealing with untrusted intermediaries. For example, a packet sent on the secure egress path goes through multiple logical hops, in this instance three logical hops are exemplified, where the hops (e.g., tiers) are highlighted by dashed lines as tier 1 (T1) 1010, tier 2 (T2) 1020, and tier 3 (T3) 1030. Specifically, the services secure egress overlay network 1001 demonstrates the secure egress path from customer pods to egress proxies by applying an overlay network(s) to achieve egress control and isolation. A packet sent on the secure egress path goes through the tiers, where T1 1010 shows the flow from a customer pod to an untrusted worker node, T2 1020 shows the flow from the worker node to the egress proxy, and T3 1030 shows the flow from the egress proxy to the Internet (e.g., public communication network). These three parts together ensure that the Internet-bound traffic from the untrusted worker node is well isolated and can only go to the allowed destinations.

At tier 1 (T1) 1010, the first step in enabling external access from the customer pod 624 is to put an ethernet device in its namespace. As described above in connection with FIG. 6, example embodiments use Virtual Ethernet (veth) pairs for putting the ethernet device in its namespace. Virtual ethernet (veth) pairs allow communication between network namespaces. A veth pair is a pair of virtual network interfaces that are connected together in a manner that any traffic (e.g., data) sent through one interface of the veth pair is received by the other interface of the veth pair, in order to provide a way for isolated environments to communicate with each other and/or with a host system. For example, each veth pair can consist of two virtual network interfaces, which can be referred to as a "parent interface" and a "child interface." The parent interface can be attached to the host system and/or another network interface, whereas the child interface can be attached to a virtual machine or container. For example, when traffic is sent through the child interface of the veth pair, the traffic is transmitted to the parent interface of the veth pair, and then the traffic is transmitted to the destination network.

For example, at tier 1 (T1) 1010, at one end of the veth pair, veth0 1012 is put in the customer pod's namespace and at the other end, veth1 1013 is put in the worker node's 610 default namespace. Any packet transmitted on veth0 1012 is immediately received on veth1 1013 and vice-versa. For packets arriving on veth1 1013, the system ensures that their destination is allowed by the egress policy by attaching one or more extended Berkeley Packet Filter (eBPF) hooks 1014 to the veth1 1013 device. eBPF hooks can include a type of eBPF program used to intercept and/or modify system calls and/or other kernel events by allowing developers to monitor and control system behavior in real-time or near real-time.

For example, the eBPF 1023 can include an in-kernel virtual machine that allows code execution in the kernel space. It can be used to complement or replace kernel packet processing among other things. The eBPF hook 1014 on veth1 1013 guarantees that only packets with allowed destinations can be forwarded to the next hop (e.g., geneve0 device 1021). Otherwise, packets are dropped, and the violation is reported. This also guarantees that no packet can be sent to other sandboxes or worker node 610 instances.

At tier 2 (T2) 1020, after getting the packet out of the customer pod 624 and validating that its destination is allowed, the system needs to send the packet to the egress proxy, proxy service 115. GENEVE tunneling is used for T2 1020. In virtualized environments, such as the virtualized environment of FIG. 10, GENEVE (Generic Network Virtualization Encapsulation) can include a network tunneling protocol used for transmitting network traffic between or among virtual machines over an IP network. A GENEVE device can include a virtual network device that implements the GENEVE protocol and is used to provide overlay networks that span multiple physical hosts or clusters. GENEVE encapsulates packets within UDP packets, for example, and uses network virtualization headers to allow multiple virtual networks to be transmitted over the same physical network infrastructure (e.g., physical 1025). GENEVE encapsulation 1022 is further described and depicted in connection with FIG. 10. While GENEVE devices and packetization are used in the example embodiment of FIG. 10, it will be understood to those skilled in the art, that embodiments and examples of the inventive subject matter can be practiced with other network tunneling protocols. At T2 1020, the system uses GENEVE to embed a policy identifier for each packet so the proxy service 115 can use that information to perform further granular egress control.

At tier 3 (T3) 1030, the egress proxy 614 serves as a security barrier and the only egress gateway from the worker node 610. When a packet is received on the GENEVE device geneve0 1031 in the egress proxy 614, the packet is decapsulated 1028 to retrieve the original packet 1032 and the policy ID. The policy ID is used to look up the egress policy and validate that the original destination (e.g., maps.google-.com's IP address) is allowed, specifically when the original destination is an untrusted intermediary. This validation generates a verified packet 1033 and is effectively identical to what is performed at veth1 1013 in the worker node 610. This second check is used to prevent a compromised worker node 610 (e.g., "zero trust execution platform") from exfiltrating data. Any violations will be reported to security. To ensure a compromised node cannot bypass the egress proxies, the deployment is configured to route all Internet-bound traffic through the egress proxies, even if the packet destination is not the egress proxies. The proxy will then drop any Internet-bound traffic that is not GENEVE encapsulated (and passes its policy enforcement), effectively locking down the deployment from accessing the Internet without going through the egress proxies.

If the packet passes all the checks, the network egress access control system 510 changes the packet's source address from the customer pod 624 IP address to an egress proxy 614 IP address using Source Network Address Translation (SNAT). This needs to be done because the sandbox IP address is a private IP address and is not generally routable, and a routable IP address is needed for the response packet to be transmitted to the Internet 1081 using UDF external access. The network egress access control system 510 maintains a connection map so that it can correctly identify the target execution platform and the customer pod 624 for the response packet. These 3 parts, Tiers 1-3 together, ensure that the Internet-bound traffic from the worker node 610 is well isolated and can only go to the allowed destinations of the Internet 1081 despite an untrusted intermediary.

In example embodiments, statically resolving hostnames in the compute service manager 108 is explored. The L3/L4 based egress control discussed above is based on IP addresses. However, almost every Internet connection starts with a DNS, so it is critical to secure domain name resolution from a UDF, especially to avoid data exfiltration over DNS. In such additional examples, the hostname resolution is performed in the compute service manager 108 at the start of the query and the mapping is sent to the worker node 610 in an egress policy document. The eBPF based network can enforce the IP restrictions based on this static mapping. The mapping can also be used to populate the hosts file inside the customer pod 624. For allowed destinations, hosts can be used for name resolution. If DNS resolution is attempted for a disallowed name, eBPF code can drop the DNS packet and report user error. This static approach can be used in most of the use cases explored herein as the jobs are usually short-lived. However, for services using DNS for failover or load balancing (e.g., round robin), this approach may not be optimal, and a mitigation is to select an appropriate Time To Live (TTL) field in the IP header of the packet to indicate the maximum number of hops that a packet can travel before it is discarded by a gateway in order to refresh the IP list.

Some example embodiments of the overlay network 1001 can include allowing dynamic DNS resolution at runtime from the UDF and supporting a custom DNS resolver. For example, an account administrator can specify the allowed DNS resolvers in the allow list (e.g., allowed host list) such that the DNS requests pass the egress control. In another example, the system can implement a dedicated DNS resolver at a secure location (e.g., egress proxy 614), and proxy all hostname lookups from one or more UDF. For example, the network egress access control system 510 can provide a local DNS proxy with networking and security capabilities for containerized applications using eBPF technology to enable fast and secure communication between containers.

While the example of FIG. 10 describes the use of the overlay network in reference to external access, it will be understood by those having ordinary skill in the art that the overlay network described herein can further be used internally by components of the cloud data platform. For example, this system, in addition to being used for external access, can be used to allow for instances of the same workload or related workloads to communicate with each other over example embodiments of an overlay network. For example, one or more sandbox instances of the same job can be configured to communicate with each other over the overlay network described herein.

Figure 11:
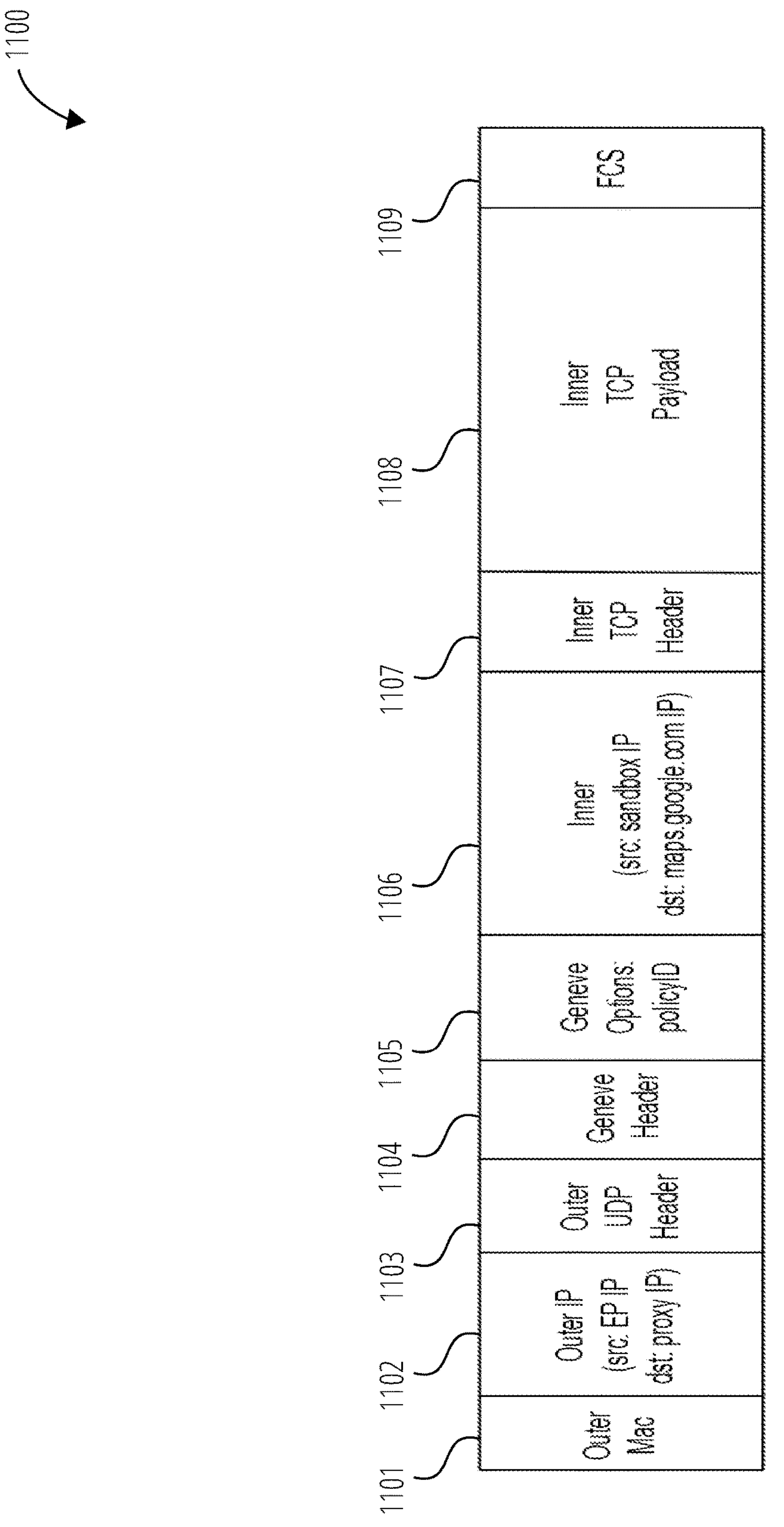
FIG. 11 is a block diagram illustrating GENEVE encapsulation, according to some example embodiments.

FIG. 11 is a block diagram illustrating GENEVE encapsulation 1100 as used throughout examples of the present disclosure, in accordance with example embodiments.

GENEVE encapsulation protocol is an encapsulation protocol implemented in Linux to create a tunnel between two network devices. As noted in FIG. 5, in virtualized environments, GENEVE can include a network tunneling protocol used for transmitting network traffic between or among virtual machines over an IP network. GENEVE is implemented herein as it uses User Datagram Protocol (UDP) as the transport protocol and encapsulates the original packet as the payload, thereby allowing the cloud data platform to set a different destination while providing the flexibility to customize its metadata.

A packet encapsulated in the GENEVE format as described in FIG. 11 includes a tunnel header encapsulated in UDP over IP. The GENEVE format includes an outer Media Access Control (MAC) address 1101 providing the source or destination address in the outermost layer of a network packet header. In GENEVE format, the outer IP 1102 refers to the IP header of the outermost layer of the encapsulated packet including a source execution platform IP address and a destination proxy IP address. The outer UDP header 1103 refers to the UDP header of the outermost layer of the encapsulated packet, which can include information about the source and destination UDP ports, among other information.

The GENEVE header 1104 includes several fields including, for example, the version of the GENEVE protocol, the variable-length options, the encapsulated protocol, the virtual network identifier (VNI), among other information. The GENEVE options 1105 are used to provide additional information about the encapsulated packet, such as, for example, a policy identifier (ID). The GENEVE inner 1106 refers to the original packet that is being encapsulated and transmitted over the virtual network. In some examples, the inner includes a source address including the sandbox IP address and a destination address, such as the maps.google.com IP address. The purpose of encapsulating the inner packet within the GENEVE header is to allow the virtual network to maintain the same level of isolation, security, control, and performance as a physical network. The inner 1106 can be decrypted and processed by the receiving device once it has been decapsulated from the GENEVE header.

The inner transmission control protocol (TCP) header 1107 is the header of the original TCP packet that is being encapsulated and transmitted over the virtual network. The inner TCP payload 1108 is the actual data that is being transmitted within the TCP packet that is being encapsulated and transmitted over the virtual network. When the TCP packet is encapsulated within a GENEVE header, the entire packet, including the TCP header and payload, becomes the inner packet. Last in the GENEVE encapsulation format is the frame check sequence (FCS) 1109, which refers to the cyclic redundancy check value that is added to the end of the packet to ensure integrity of the packet during transmission.

Figure 12:
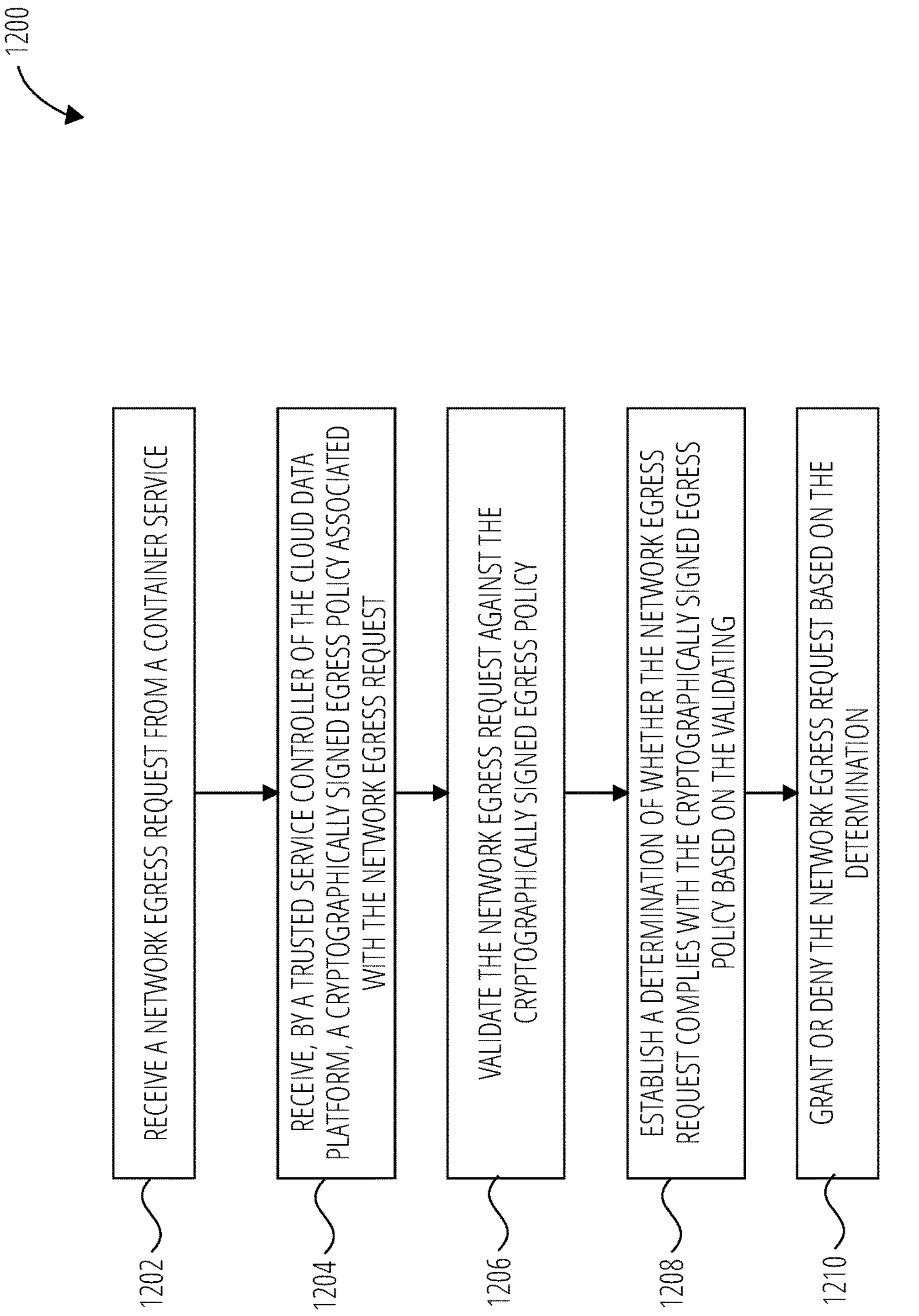
FIG. 12 is a flow diagram illustrating operations of a cloud data platform performing an example method for implementing network egress access control with untrusted intermediaries, according to some example embodiments.

FIG. 12 is a flow diagram illustrating operations of a cloud data platform performing an example method 1200 for implementing network egress access control with untrusted intermediaries, according to some example embodiments.

The method 1200 can be embodied in machine-readable instructions for execution by one or more hardware components (e.g., one or more processors) such that the operations of the method 1200 can be performed by components of the cloud data platform 102. Accordingly, the method 1200 is described below, by way of example with reference to components of the cloud data platform 102, such as proxy service 115, egress controller 828, or compute service manager 108. However, it shall be appreciated that method 1200 can be deployed on various other hardware configurations and is not intended to be limited to deployment within the cloud data platform 102.

Depending on the embodiment, an operation of the method 1200 can be repeated in different ways or involve intervening operations not shown. Though the operations of the method 1200 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined or omitted, or be executed in parallel.

At operation 1202, an egress controller (e.g., egress controller 828) receives a network egress request from a container service within a cloud data platform. At operation 1204, the egress controller receives a cryptographically signed egress policy associated with the network egress request. At operation 1206, the egress controller validates the network egress request against the cryptographically signed egress policy. At operation 1208, the egress controller establishes a determination of whether the network egress request complies with the cryptographically signed egress policy based on the validating. At operation 1210, the egress controller grants or denies the network egress request based on the determination.

In some examples, the method 1200 includes implementing network egress access control with untrusted intermediaries and managing network egress in a cloud data platform. The method 1200 can include a services controller subsystem, a cluster egress controller subsystem, a worker egress controller subsystem, and an egress proxy subsystem. For example, the services controller subsystem is configured to schedule and manage execution of services and to convert customer account administrator-defined egress policies into cryptographically signed egress policies. The cluster egress controller subsystem is configured to validate DNS requests from services and to update the signed egress policies with specific worker virtual machine (VM) IP addresses and egress target IP addresses as resolved by DNS requests. The worker egress controller subsystem is configured to translate and encapsulate service DNS and network traffic to the cluster egress controller for DNS resolution and to an egress proxy for network traffic without requiring service implementations to be aware of the secure egress process. The egress proxy subsystem is configured to receive egress policies and network traffic from worker nodes, validate the policies, enforce egress network rules as described by the policies, and manage the routing of return traffic from external network resources back to the appropriate service.

In some examples, the method 1200 includes egress constraints for a given compute worker node that are passed from a trusted controller through an untrusted worker node to a trusted egress controller. The method includes granting access, by the trusted controller, from a container to a destination leveraging cryptographic signatures and using the granted access, by the container, to request DNS resolution of an Internet Protocol (IP) address. The method 1200 receives an updated access grant enabling access to the resolved IP address and uses the updated access grant to request network egress to that host and port.

Described implementations of the subject matter can include one or more features, alone or in combination as illustrated below by way of example.

Example 1 is a system comprising: one or more hardware processors of a machine; and at least one memory storing instructions that, when executed by the one or more hardware processors, cause the system to perform operations comprising: receiving a network egress request, via an untrusted execution node, from a container service within a cloud data platform; receiving a cryptographically signed egress policy associated with the network egress request; validating the network egress request against the cryptographically signed egress policy; establishing a determination of whether the network egress request complies with the cryptographically signed egress policy based on the validating; and granting or denying the network egress request based on the determination.

In Example 2, the subject matter of Example 1 includes, wherein the network egress request includes a request to access an external service over a public communication network.

In Example 3, the subject matter of Examples 1-2 includes, the operations further comprising: configuring the container service to use a local Domain Name System (DNS) resolver for DNS requests; forwarding the DNS requests from the container service to an off-node DNS resolver including policy enforcement capabilities, wherein the off-node DNS resolver is located within a control plane node of the cloud data platform; and resolving the DNS requests based on allowed hostnames specified in the cryptographically signed egress policy.

In Example 4, the subject matter of Example 3 includes, the operations further comprising: generating a pinned IP policy based on the allowed hostnames; registering the pinned IP policy with an egress proxy, the egress proxy configured to receive network traffic from an untrusted worker node; and enabling secure network egress for the container service based on the pinned IP policy.

In Example 5, the subject matter of Example 4 includes, the operations further comprising: defining an external access integration (EAI) that specifies allowed destination IP:Port pairs and DNS hostnames that the egress proxy is allowed to use; signing the configmap with a digital signature; and storing the signed configmap in a secure repository of the cloud data platform, the secure repository accessible to the egress proxy.

In Example 6, the subject matter of Examples 1-5 includes, wherein validating the network egress request against the cryptographically signed egress policy further comprises: intercepting network traffic originating from the container service using an extended Berkeley Packet Filter (eBPF) program; enforcing a network policy on the network traffic according to the eBPF program; and dropping unauthorized network traffic.

In Example 7, the subject matter of Examples 1-6 includes, wherein the cryptographically signed egress policy associated with the network egress request includes a list of trusted domains for DNS resolution, the list of trusted domains is defined by a customer account administrator.

Example 8 is a method comprising: receiving, via an untrusted execution node, a network egress request from a container service within a cloud data platform; receiving a cryptographically signed egress policy associated with the network egress request; validating the network egress request against the cryptographically signed egress policy; establishing a determination of whether the network egress request complies with the cryptographically signed egress policy based on the validating; and granting or denying the network egress request based on the determination.

In Example 9, the subject matter of Example 8 includes, wherein the network egress request includes a request to access an external service over a public communication network.

In Example 10, the subject matter of Examples 8-9 includes, configuring the container service to use a local Domain Name System (DNS) resolver for DNS requests; forwarding the DNS requests from the container service to an off-node DNS resolver including policy enforcement capabilities, wherein the off-node DNS resolver is located within a control plane node of the cloud data platform; and resolving the DNS requests based on allowed hostnames specified in the cryptographically signed egress policy.

In Example 11, the subject matter of Example 10 includes, generating a pinned IP policy based on the allowed hostnames; registering the pinned IP policy with an egress proxy, the egress proxy configured to receive network traffic from an untrusted worker node; and enabling secure network egress for the container service based on the pinned IP policy.

In Example 12, the subject matter of Example 11 includes, defining an external access integration (EAI) that specifies allowed destination IP:Port pairs and DNS hostnames that the egress proxy is allowed to use; signing the configmap with a digital signature; and storing the signed configmap in a secure repository of the cloud data platform, the secure repository accessible to the egress proxy.

In Example 13, the subject matter of Examples 8-12 includes, wherein validating the network egress request against the cryptographically signed egress policy further comprises: intercepting network traffic originating from the container service using an extended Berkeley Packet Filter (eBPF) program; enforcing a network policy on the network traffic according to the eBPF program; and dropping unauthorized network traffic.

In Example 14, the subject matter of Examples 8-13 includes, wherein the cryptographically signed egress policy associated with the network egress request includes a list of trusted domains for DNS resolution, the list of trusted domains is defined by a customer account administrator.

Example 15 is a machine-storage medium embodying instructions that, when executed by a machine, cause the machine to perform operations comprising: receiving a network egress request from a container service within a cloud data platform; receiving, via an untrusted execution node by a trusted service controller of the cloud data platform, a cryptographically signed egress policy associated with the network egress request; validating, by one or more hardware processors, the network egress request against the cryptographically signed egress policy; establishing a determination of whether the network egress request complies with the cryptographically signed egress policy based on the validating; and granting or denying the network egress request based on the determination.

In Example 16, the subject matter of Example 15 includes, wherein the network egress request includes a request to access an external service over a public communication network.

In Example 17, the subject matter of Examples 15-16 includes, the operations further comprising: configuring the container service to use a local Domain Name System (DNS) resolver for DNS requests; forwarding the DNS requests from the container service to an off-node DNS resolver including policy enforcement capabilities, wherein the off-node DNS resolver is located within a control plane node of the cloud data platform; and resolving the DNS requests based on allowed hostnames specified in the cryptographically signed egress policy.

In Example 18, the subject matter of Example 17 includes, the operations further comprising: generating a pinned IP policy based on the allowed hostnames; registering the pinned IP policy with an egress proxy, the egress proxy configured to receive network traffic from an untrusted worker node; and enabling secure network egress for the container service based on the pinned IP policy.

In Example 19, the subject matter of Example 18 includes, the operations further comprising: defining an external access integration (EAI) that specifies allowed destination IP:Port pairs and DNS hostnames that the egress proxy is allowed to use; signing the configmap with a digital signature; and storing the signed configmap in a secure repository of the cloud data platform, the secure repository accessible to the egress proxy.

In Example 20, the subject matter of Examples 15-19 includes, wherein validating the network egress request against the cryptographically signed egress policy further comprises: intercepting network traffic originating from the container service using an extended Berkeley Packet Filter (eBPF) program; enforcing a network policy on the network traffic according to the eBPF program; and dropping unauthorized network traffic.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 13:
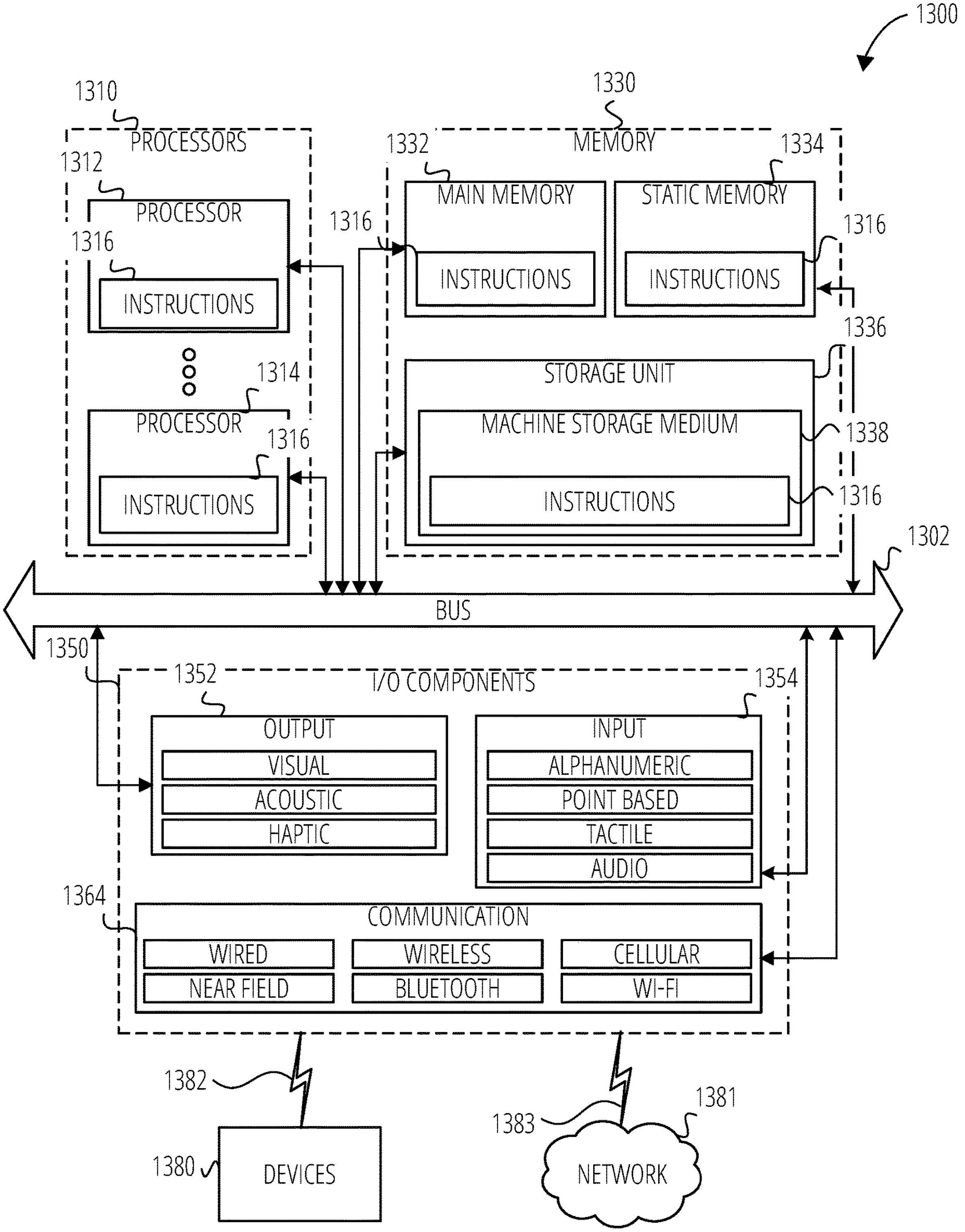
FIG. 13 illustrates a diagrammatic representation of a machine in the form of a computer system within which a set of instructions can be executed for causing the machine to perform any one or more of the methodologies discussed herein, according to some example embodiments.

FIG. 13 illustrates a diagrammatic representation of a machine 1300 in the form of a computer system within which a set of instructions can be executed for causing the machine 1300 to perform any one or more of the methodologies discussed herein, according to an example embodiment. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein can be executed. For example, the instructions 1316 may cause the machine 1300 to execute any one or more operations of any one or more of the methods described herein. As another example, the instructions 1316 may cause the machine 1300 to implement portions of the data flows described herein. In this way, the instructions 1316 transform a general, non-programmed machine into a particular machine 1300 (e.g., the compute service manager 108, the execution platform 110, client device 114, proxy service 115) that is specially configured to carry out any one of the described and illustrated functions in the manner described herein.

In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 includes processors 1310, memory 1330, and input/output (I/O) components 1350 configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310 such as via the bus 1302. The main memory 1332, the static memory 1334, and the storage unit 1336 comprising a machine storage medium 1338 may store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 1350 may include communication components 1364 operable to couple the machine 1300 to a network 1381 via a coupling 1383 or to devices 1380 via a coupling 1382. For example, the communication components 1364 may include a network interface component or another suitable device to interface with the network 1381. In further examples, the communication components 1364 may include wired communication components, wireless communication components, cellular communication components, and other communication components to provide communication via other modalities. The devices 1380 can be another machine or any of a wide variety of peripheral devices (e.g., a peripheral device coupled via a universal serial bus (USB)). For example, as noted above, the machine 1300 may correspond to any one of the client devices 114, the compute service manager 108, the execution platform 110, and the devices 1380 may include any other of these systems and devices.

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1381 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1381 or a portion of the network 1381 may include a wireless or cellular network, and the coupling 1383 can be a Code Division Multiple Access (CDMA) connection, a Global System for Mobile communications (GSM) connection, or another type of cellular or wireless coupling. In this example, the coupling 1383 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 can be transmitted or received over the network 1381 using a transmission medium via a network interface device (e.g., a network interface component included in the communication components 1364) and utilizing any one of a number of well-known transfer protocols (e.g., hypertext transfer protocol (HTTP)). Similarly, the instructions 1316 can be transmitted or received using a transmission medium via the coupling 1382 (e.g., a peer-to-peer coupling) to the devices 1380. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The terms "machine-readable medium," "computer-readable medium," and "device-readable medium" mean the same thing and can be used interchangeably in this disclosure. The terms are defined to include both machine-storage media and transmission media. Thus, the terms include both storage devices/media and carrier waves/modulated data signals.

The various operations of example methods described herein can be performed, at least partially, by one or more processors that are temporarily configured (e.g., by software) or permanently configured to perform the relevant operations. Similarly, the methods described herein can be at least partially processor implemented. For example, at least some of the operations of the methods described herein can be performed by one or more processors. The performance of certain of the operations can be distributed among the one or more processors, not only residing within a single machine, but also deployed across a number of machines. In some example embodiments, the processor or processors can be located in a single location (e.g., within a home environment, an office environment, or a server farm), while in other embodiments the processors can be distributed across a number of locations.

Although the embodiments of the present disclosure have been described with reference to specific example embodiments, it will be evident that various modifications and changes can be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be used and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

one or more hardware processors of a machine; and at least one memory storing instructions that, when executed by the one or more hardware processors, cause the system to perform operations comprising:

receiving a network egress request, via an untrusted execution node, from a container service within a cloud data platform;

receiving a cryptographically signed egress policy associated with the network egress request;

validating the network egress request against the cryptographically signed egress policy, the validating comprising forwarding Domain Name System (DNS) requests from the container service to an off-node DNS resolver including policy enforcement capabilities;

establishing a determination of whether the network egress request complies with the cryptographically signed egress policy based on the validating; and granting or denying the network egress request based on the determination, the granting comprising proxying network traffic associated with the network egress request through an egress proxy that performs network address translation to route outbound and corresponding return traffic for the container service.

2. The system of claim 1, wherein the network egress request includes a request to access an external service over a public communication network.

3. The system of claim 1, the operations further comprising:

configuring the container service to use a local DNS resolver for the DNS requests; and resolving the DNS requests based on allowed hostnames specified in the cryptographically signed egress policy, wherein the off-node DNS resolver is located within a control plane node of the cloud data platform.

4. The system of claim 3, the operations further comprising:

generating a pinned IP policy based on the allowed hostnames;

registering the pinned IP policy with an egress proxy, the egress proxy configured to receive network traffic from an untrusted worker node; and enabling secure network egress for the container service based on the pinned IP policy.

5. The system of claim 4, the operations further comprising:

defining an external access integration (EAI) that specifies allowed destination IP: Port pairs and DNS hostnames that the egress proxy is allowed to use;

signing a configmap comprising the egress policy with a digital signature to generate a signed configmap; and storing the signed configmap in a secure repository of the cloud data platform, the secure repository being accessible to the egress proxy.

6. The system of claim 1, wherein validating the network egress request against the cryptographically signed egress policy further comprises:

intercepting network traffic originating from the container service using an extended Berkeley Packet Filter (eBPF) program;

enforcing a network policy on the network traffic according to the eBPF program; and dropping unauthorized network traffic.

7. The system of claim 1, wherein the cryptographically signed egress policy associated with the network egress request includes a list of trusted domains for DNS resolution, the list of trusted domains is defined by a customer account administrator.

8. A method comprising:

receiving, via an untrusted execution node, a network egress request from a container service within a cloud data platform;

receiving a cryptographically signed egress policy associated with the network egress request;

validating the network egress request against the cryptographically signed egress policy, the validating comprising forwarding Domain Name System (DNS) requests from the container service to an off-node DNS resolver including policy enforcement capabilities;

establishing a determination of whether the network egress request complies with the cryptographically signed egress policy based on the validating; and granting or denying the network egress request based on the determination, the granting comprising proxying network traffic associated with the network egress request through an egress proxy that performs network address translation to route outbound and corresponding return traffic for the container service.

9. The method of claim 8, wherein the network egress request includes a request to access an external service over a public communication network.

10. The method of claim 8, further comprising:

configuring the container service to use a local DNS resolver for the DNS requests; and resolving the DNS requests based on allowed hostnames specified in the cryptographically signed egress policy, wherein the off-node DNS resolver is located within a control plane node of the cloud data platform.

11. The method of claim 10, further comprising:

generating a pinned IP policy based on the allowed hostnames;

registering the pinned IP policy with an egress proxy, the egress proxy configured to receive network traffic from an untrusted worker node; and enabling secure network egress for the container service based on the pinned IP policy.

12. The method of claim 11, further comprising:

defining an external access integration (EAI) that specifies allowed destination IP: Port pairs and DNS hostnames that the egress proxy is allowed to use;

signing a configmap comprising the egress policy with a digital signature to generate a signed configmap; and storing the signed configmap in a secure repository of the cloud data platform, the secure repository accessible to the egress proxy.

13. The method of claim 8, wherein validating the network egress request against the cryptographically signed egress policy further comprises:

intercepting network traffic originating from the container service using an extended Berkeley Packet Filter (eBPF) program;

enforcing a network policy on the network traffic according to the eBPF program; and dropping unauthorized network traffic.

14. The method of claim 8, wherein the cryptographically signed egress policy associated with the network egress request includes a list of trusted domains for DNS resolution, the list of trusted domains is defined by a customer account administrator.

15. A machine-storage medium embodying instructions that, when executed by a machine, cause the machine to perform operations comprising:

receiving a network egress request from a container service within a cloud data platform;

receiving, via an untrusted execution node by a trusted service controller of the cloud data platform, a cryptographically signed egress policy associated with the network egress request;

validating, by one or more hardware processors, the network egress request against the cryptographically signed egress policy, the validating comprising forwarding Domain Name System (DNS) requests from the container service to an off-node DNS resolver including policy enforcement capabilities;

establishing a determination of whether the network egress request complies with the cryptographically signed egress policy based on the validating; and granting or denying the network egress request based on the determination, the granting comprising proxying network traffic associated with the network egress request through an egress proxy that performs network address translation to route outbound and corresponding return traffic for the container service.

16. The machine-storage medium of claim 15, wherein the network egress request includes a request to access an external service over a public communication network.

17. The machine-storage medium of claim 15, the operations further comprising:

configuring the container service to use a local DNS resolver for the DNS requests; and resolving the DNS requests based on allowed hostnames specified in the cryptographically signed egress policy, wherein the off-node DNS resolver is located within a control plane node of the cloud data platform.

18. The machine-storage medium of claim 17, the operations further comprising:

generating a pinned IP policy based on the allowed hostnames;

registering the pinned IP policy with an egress proxy, the egress proxy configured to receive network traffic from an untrusted worker node; and enabling secure network egress for the container service based on the pinned IP policy.

19. The machine-storage medium of claim 18, the operations further comprising:

defining an external access integration (EAI) that specifies allowed destination IP: Port pairs and DNS hostnames that the egress proxy is allowed to use;

signing a configmap comprising the egress policy with a digital signature to generate a signed configmap; and storing the signed configmap in a secure repository of the cloud data platform, the secure repository being accessible to the egress proxy.

20. The machine-storage medium of claim 15, wherein validating the network egress request against the cryptographically signed egress policy further comprises:

intercepting network traffic originating from the container service using an extended Berkeley Packet Filter (eBPF) program;

enforcing a network policy on the network traffic according to the eBPF program; and dropping unauthorized network traffic.

* * * * *